(12) United States Patent
Ohta et al.

(10) Patent No.: US 8,210,470 B2
(45) Date of Patent: Jul. 3, 2012

(54) MOVING APPARATUS

(75) Inventors: Yoshiji Ohta, Kashiwara (JP); Keita Hara, Kashihara (JP); Masaki Hamamoto, Sakurai (JP)

(73) Assignee: Sharp Kabushiki Kaisha, Osaka (JP)

( * ) Notice: Subject to any disclaimer, the term of this patent is extended or adjusted under 35 U.S.C. 154(b) by 1670 days.

(21) Appl. No.: 11/166,743

(22) Filed: Jun. 23, 2005

(65) Prior Publication Data

US 2006/0060698 A1   Mar. 23, 2006

(30) Foreign Application Priority Data

Jun. 24, 2004 (JP) ................................ 2004-186167
Apr. 6, 2005 (JP) ................................ 2005-110117
Jun. 16, 2005 (JP) ................................ 2005-176038

(51) Int. Cl.
*B64C 33/02* (2006.01)

(52) U.S. Cl. ........................................... 244/22; 244/72
(58) Field of Classification Search .................... 244/11, 244/22, 28, 72; 43/2, 3; 446/35
See application file for complete search history.

(56) References Cited

U.S. PATENT DOCUMENTS

| | | | | |
|---|---|---|---|---|
| 2,578,845 A * | 12/1951 | Schmidt | | 244/72 |
| 5,993,286 A * | 11/1999 | Tacquard et al. | | 446/351 |
| 6,082,671 A * | 7/2000 | Michelson | | 244/72 |
| 6,206,324 B1 * | 3/2001 | Smith | | 244/72 |
| 6,227,483 B1 * | 5/2001 | Therriault | | 244/20 |
| 6,250,585 B1 * | 6/2001 | Pell | | 244/22 |
| 6,321,480 B1 * | 11/2001 | Solomon | | 43/3 |
| 6,339,894 B1 * | 1/2002 | Solomon | | 43/3 |
| 6,565,039 B2 * | 5/2003 | Smith | | 244/72 |
| 6,574,903 B2 * | 6/2003 | Solomon | | 43/3 |
| 6,783,097 B1 * | 8/2004 | Smith | | 244/72 |
| 6,840,477 B2 * | 1/2005 | Hamamoto et al. | | 244/22 |
| 6,926,230 B2 * | 8/2005 | Ohta et al. | | 244/22 |
| 6,974,356 B2 * | 12/2005 | Hobson et al. | | 440/13 |
| 7,089,084 B2 * | 8/2006 | Ohta et al. | | 700/245 |
| 2002/0117583 A1 * | 8/2002 | Hamamoto et al. | | 244/72 |
| 2005/0230522 A1 * | 10/2005 | Smith | | 244/22 |

FOREIGN PATENT DOCUMENTS

| | | |
|---|---|---|
| JP | 47-034878 B | 9/1972 |
| JP | 05-282040 | 10/1993 |
| JP | 06-099369 | 4/1994 |
| JP | 06-305455 | 11/1994 |
| JP | 09-272083 | 10/1997 |
| JP | 2000-317148 | 11/2000 |
| JP | 2002-326599 A | 11/2002 |
| JP | 2003-135866 A | 5/2003 |

* cited by examiner

*Primary Examiner* — Joshua J Michener
(74) *Attorney, Agent, or Firm* — Edwards Wildman Palmer LLP; David G. Conlin; David A. Tucker

(57) ABSTRACT

In a moving apparatus, flapping angle of a front wing shaft is $\gamma+\Delta\gamma/2$, and the flapping angle of rear wing shaft is $\gamma-\Delta\gamma/2$. Specifically, amplitude difference between front wing shaft and rear wing shaft is $\Delta\gamma$. Further, the flapping motion of front wing shaft is represented by $\sin(\tau+\phi/2)$, and the flapping motion of rear wing shaft is represented by $\sin(\tau-\phi/2)$. In other words, phase difference between the front and rear wing shafts is $\phi$. Further, amplitude difference $\Delta\gamma$ and phase difference $\phi$ are each represented by a function using a common parameter. Therefore, a control portion can independently change the amplitude difference $\Delta\gamma$ and phase difference $\phi$, so as to variously change a torsion angle formed by a tip end portion of the wing and a prescribed phantom plane. Thus, a moving apparatus that can make an efficient transition from hovering to forward or backward flight can be provided.

7 Claims, 17 Drawing Sheets

$\tau = 180°$ $\tau = 225°$ $\tau = 270°$ $\tau = 315°$

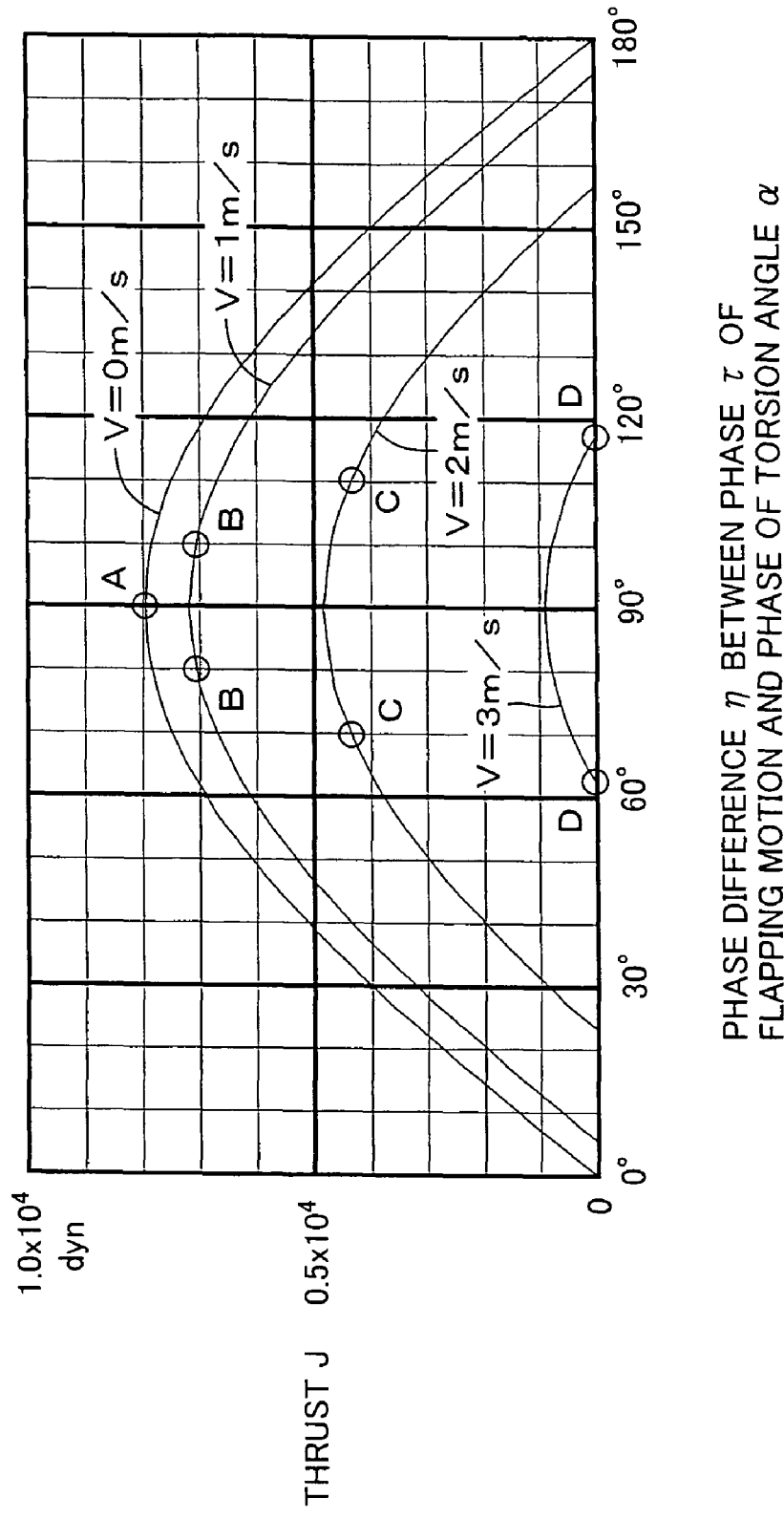

MOVING APPARATUS

This nonprovisional application is based on Japanese Patent Applications Nos. 2004-186167, 2005-110117 and 2005-176038 filed with the Japan Patent Office on Jun. 24, 2004, Apr. 6, 2005 and Jun. 16, 2005 respectively, the entire contents of which are hereby incorporated by reference.

BACKGROUND OF THE INVENTION

1. Field of the Invention

The present invention relates to a moving apparatus having a wing portion making a flapping motion.

2. Description of the Background Art

Recently, there has been a demand for an activity of a moving apparatus such as a robot in an environment that is not well maintained beforehand and has various and many obstacles, such as human living environment or at a disaster site.

A robot having wheels for movement has been proposed (for example, in Japanese Patent Laying-Open No. 05-282040) as one of conventional moving apparatuses. Multi-joint moving apparatuses have been well studied. Further, an insect type robot having six legs for improved stability has also been developed (as disclosed, for example, in Japanese Patent Laying-Open No. 06-099369).

Further, two-leg autonomous walking robot referred to as a humanoid type robot has also been developed for improved maneuverability (as disclosed, for example, in Japanese Patent Laying-Open No. 09-272083). A robot having an endless track has also been developed (as disclosed, for example, in Japanese Patent Laying-Open No. 06-305455).

In any of these moving apparatuses, moving operation is performed while the weight of the moving apparatus itself is supported by bringing a part of the apparatus to be in contact with the ground.

A moving apparatus such as a helicopter has also been known that can move in the air while avoiding obstacles on the ground.

The conventional moving apparatuses, however, have the following problems. First, at home, there are a large number of obstacles positions of which are not fixed but changed frequently, such as family members, a pet, chairs, ornaments and toys, different from factories or offices of well-maintained environment. Further, there may be a narrow passage, stairs, or a step between rooms at home.

In the conventionally developed moving apparatuses, there is a trade-off between "ability to overcome a step" and "ability to go through a small space." When wheels are used for moving a moving apparatus, for example, movement is achieved by friction force between the wheels and the contact surface. The friction force is in proportion to the normal drag at the contact surface.

When the radius of the wheel is D, the normal drag will be 0 at a step higher than the radius D. Therefore, friction force cannot be obtained where there is a step higher than the radius D, and hence the moving apparatus cannot overcome the step.

Therefore, when a moving apparatus having wheels that can move over every hole and corner in an environment is to be designed, the radius D of the wheel must be larger than the maximum step in the environment.

When the radius D of the wheel is increased to overcome a higher step, the ability to go through a small space lowers. Specifically, the diameter of the wheel having the radius D is 2 D, and the entire length of the moving apparatus having the wheel becomes larger than the diameter 2 D of the wheel. In order to go through a space that is bent at a right angle, it is necessary that the width of the space must be larger than about 2.81 times the radius D of the wheel.

In order to turn the moving apparatus at the site, there must be no obstacle in the area at least having four times the radius D.

Under the circumstances, applications of the conventional moving apparatuses having wheels have been limited to such an environment that has relatively small steps, for which wheels of relatively small diameter are used, or such an environment that is almost free of obstacles, for which relatively large wheels are used.

For a moving apparatus having multi-articulated joints, the length of the legs must be approximately the same as the step. For stable walking, a distance approximately the same as the length of the leg is necessary as a distance between grounding points of one leg and another. Therefore, as in the case of the moving apparatuses using wheels, the trade-off between "the ability to overcome a step" and "the ability to go through a small space" cannot be eliminated even by the moving apparatuses using legs.

In the two-leg walking robot disclosed in Japanese Patent Laying-Open No. 09-272083 as a moving apparatus, in order to go up stairs having the step of h, the maximum length of the leg must be longer than the step h. When a collapsible structure is adopted for the legs so that the size of the robot can be made smaller than the step h, the structure of the moving apparatus becomes very complicated.

Arrangement of furniture differs household by household. Even in one house, positions of chairs, for example, may be changed at meals. Namely, positions of furniture and the like are not fixed. Most pieces of the furniture are arranged on the floor.

When a moving apparatus is to be moved while avoiding such obstacles, the obstacles must be detected and a route must be searched on real time basis.

When the moving apparatus is adapted to have such a function, a detecting device, an operating device and the like occupy a large volume in the moving apparatus, hindering reduction in size of the moving apparatus. As a result, it becomes impossible for the moving apparatus to go through a small space.

At a disaster site or general field, the environment is very much different from that of a household that is relatively in order. Namely, there are unpaved roads, wasteland, field of grass, river, pond, cliff, or a hill of rubble. To move freely in such an environment has been almost impossible for conventional moving apparatuses using wheels, legs and the like.

Let us consider moving in the air to avoid obstacles. The moving apparatus such as an airplane stalls unless it is moving at a prescribed speed or higher, and hovering is not possible. Though hovering is possible for a moving apparatus such as a helicopter having a rotor, good maneuverability (speedy transition between the stationary state and the usual flight) cannot be attained because of large torque.

As described above, conventional moving apparatuses having wheels, legs or the like cannot move freely while avoiding obstacles at home or at a disaster site. Further, conventional moving apparatuses such as helicopters cannot attain superior maneuverability.

SUMMARY OF THE INVENTION

The present invention was made to solve the above-described problems, and its object is to provide a moving apparatus having superior maneuverability, which can move in an environment with much obstacles such as at home or a general field, while not restricted by such obstacles.

Basically, the present invention provides a moving apparatus, including: a wing portion making a flapping operation in a space where a fluid exists; a driving portion causing the flapping operation of the wing portion; a control portion controlling the driving portion; and a main body portion having the wing portion attached and the driving portion and the control portion mounted. The wing portion includes one wing shaft portion and the other wing shaft portion connected to the driving portion, and a wing body portion formed at least across the one wing shaft portion and the other wing shaft portion. The driving portion includes one driving portion causing the one wing shaft portion to make a first periodic motion, and the other driving portion causing the other wing shaft portion to make a second periodic motion separately and independently from the one driving portion.

In the moving apparatus in accordance with one aspect, the control portion controls the one driving portion and the other driving portion such that at least one of a phase difference between the first periodic motion and the second periodic motion and an amplitude difference between the first periodic motion and the second periodic motion is changed, so as to change a torsion angle formed by a tip end of the wing body portion and a prescribed phantom plane. Because of this structure, state of motion of the moving apparatus can be changed efficiently.

In the moving apparatus in accordance with the one aspect, the control portion may control the one driving portion and the other driving portion such that the phase difference changes while the amplitude difference is kept constant. This structure facilitates control for changing the state of motion of the moving apparatus.

In the moving apparatus in accordance with the one aspect, the control portion may control the one driving portion and the other driving portion such that the amplitude difference changes while the phase difference is kept constant. This structure also facilitates control for changing the state of motion of the moving apparatus.

In the moving apparatus in accordance with the one aspect, the torsion angle may make a periodic change, and the control portion may control the one driving portion and the other driving portion such that a phase difference between at least one of the first and second periodic motions and the periodic change is changed as speed of flight increases, so that thrust increases to a peak value.

In the moving apparatus in accordance with one aspect, the torsion angle may make a periodic change, and the control portion may control the one driving portion and the other driving portion such that a phase difference between at least one of the first and second periodic motions and the periodic change is kept constant. Because of this structure, the state of movement of the moving apparatus can be changed while buoyancy (lift and drag) is kept constant.

According to another aspect, in the moving apparatus, the control portion controls the one driving portion and the other driving portion such that both of a phase difference between the first periodic motion and the second periodic motion and an amplitude difference between the first periodic motion and the second periodic motion are changed in a manner represented by a common parameter, so as to change a torsion angle formed by a tip end of the wing body portion and a prescribed phantom plane.

By the above-described structure, both the phase difference and the amplitude difference can be controlled by changing one parameter, and therefore, the state of movement can be changed with a simple manner of control.

In the moving apparatus in accordance with the said another aspect, the torsion angle may make a periodic change, and the control portion may control the one driving portion and the other driving portion such that a phase difference between at least one of the first and second periodic motions and the periodic change is kept constant as both of the phase difference and the amplitude difference are changed in a manner represented by the common parameter. By the structure, the state of motion of the moving apparatus can be controlled with a simpler manner of control.

In the moving apparatus in accordance with the said another aspect, the torsion angle may make a periodic change, and the control portion may control the one driving portion and the other driving portion such that maximum amplitude of the periodic change is kept constant as both of the phase difference and the amplitude difference are changed in a manner represented by the common parameter. By this structure also, the state of motion of the moving apparatus can be controlled with a simpler manner of control.

According to a still further aspect, in the moving apparatus, the control portion controls the one driving portion and the other driving portion such that the first periodic motion and the second periodic motion come to have the same period, so as to change a torsion angle formed by a tip end of the wing body portion and a prescribed phantom plane. Because of this structure, the state of motion of the moving apparatus can be controlled with a simple manner of control. Further, each of the first periodic motion and the second periodic motion may be simple harmonic oscillation.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 27 is another graph representing a relation between thrust and difference between the phase of flapping motion and phase of torsion angle, at various ground speeds.

DESCRIPTION OF THE PREFERRED EMBODIMENTS

Figure 1:
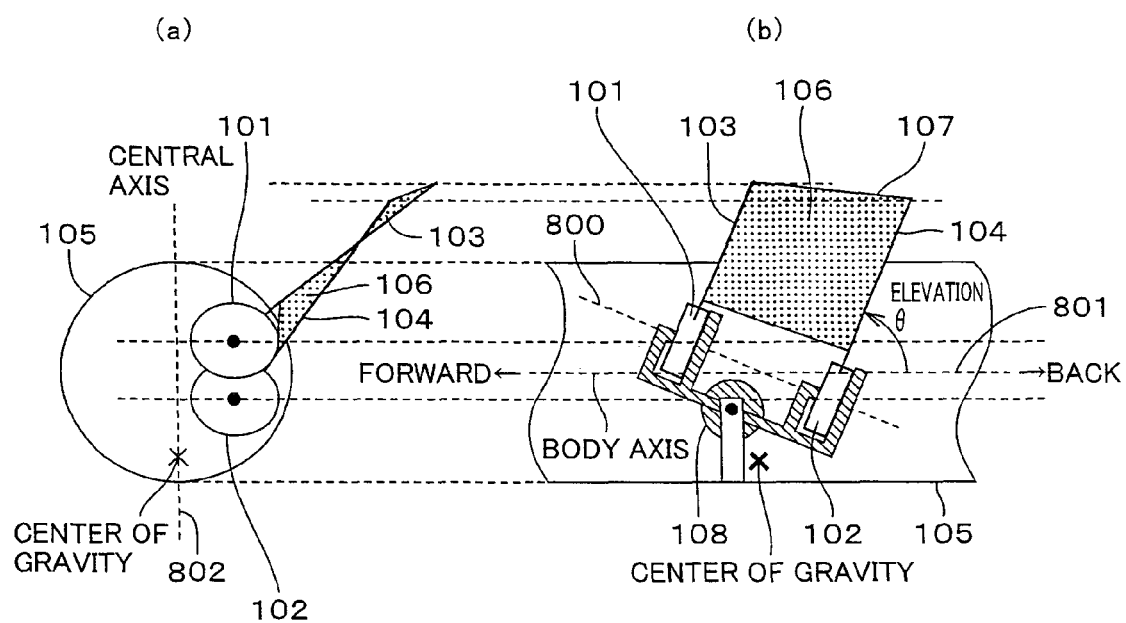
FIG. 1 is an illustration of a flapping apparatus in accordance with an embodiment, including a partial plan view (a) and a partial side view (b).
Figure 2:
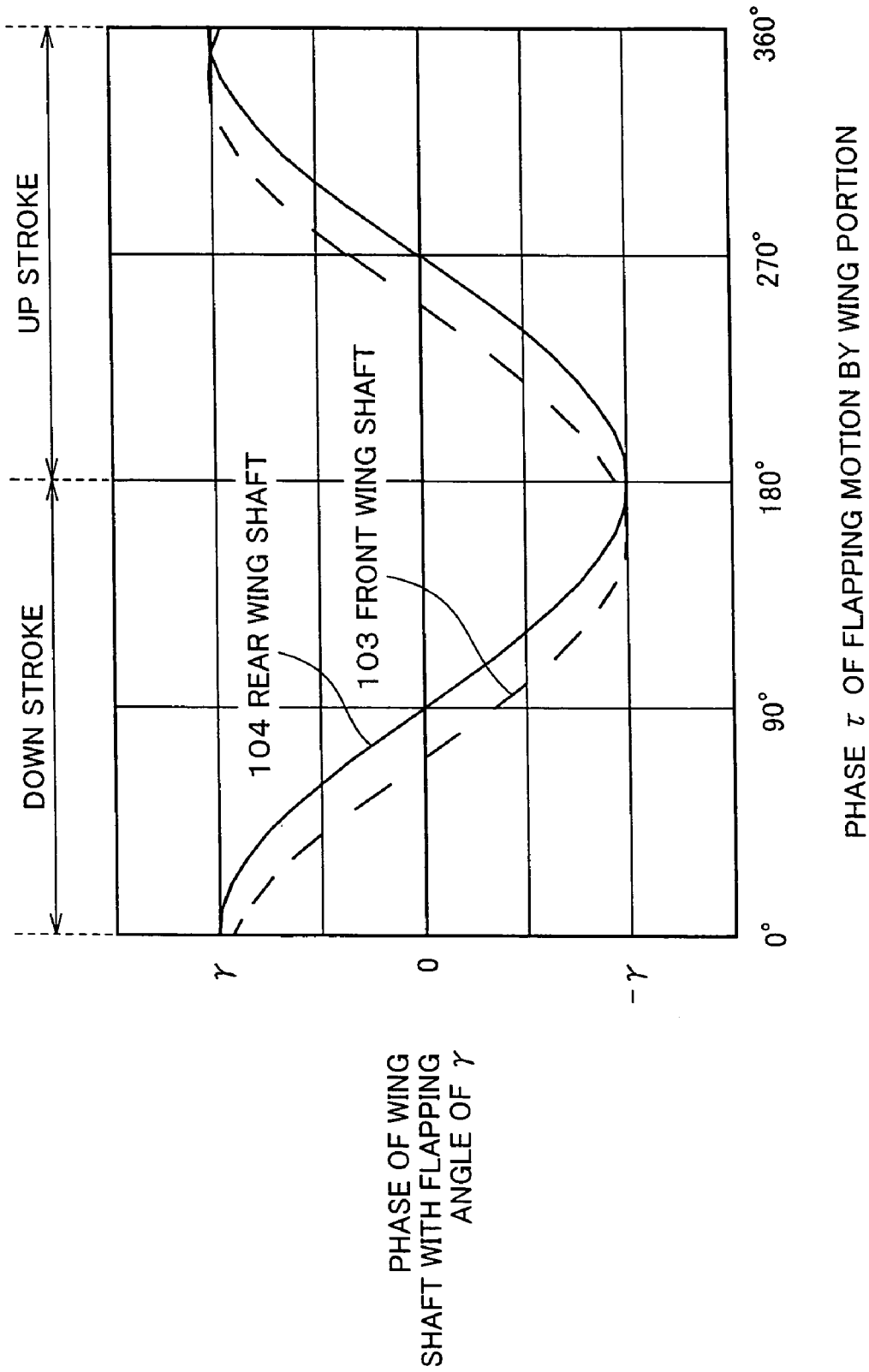
FIG. 2 is a graph representing a relation between flapping motion and a phase of the flapping motion, in the flapping apparatus of the embodiment.
Figure 3:
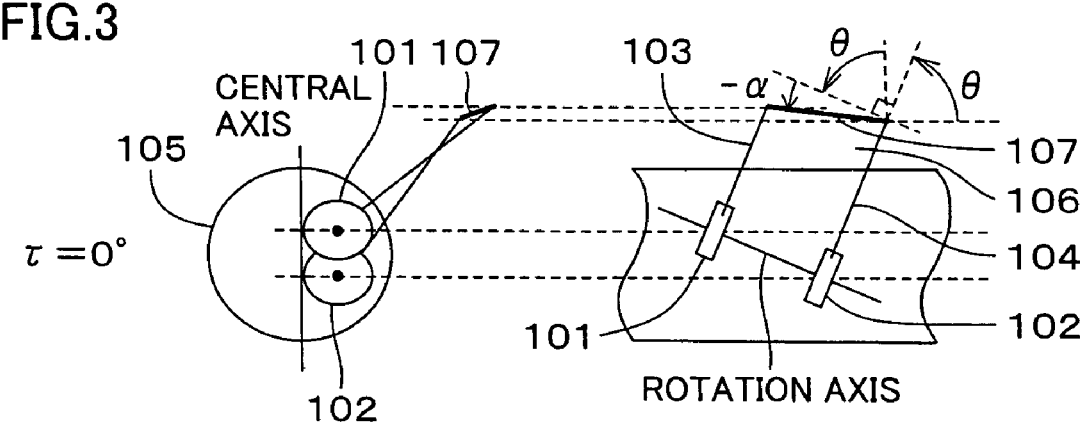
FIGS. 3 to 10 are illustrations showing the first to eighth states of flapping operation by the flapping apparatus of the embodiment.
Figure 4:
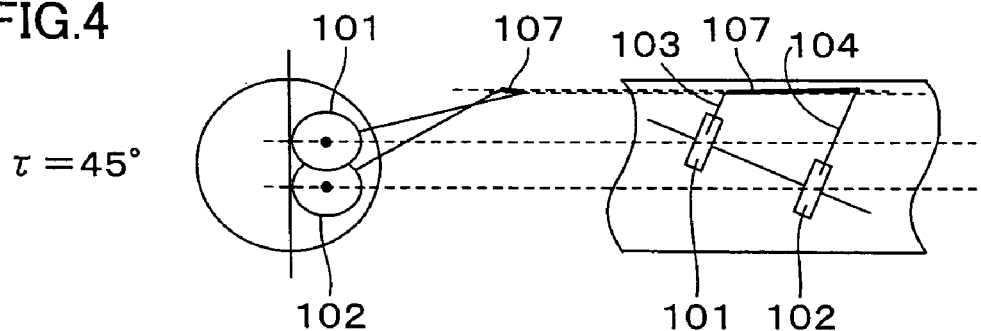
Figure 5:
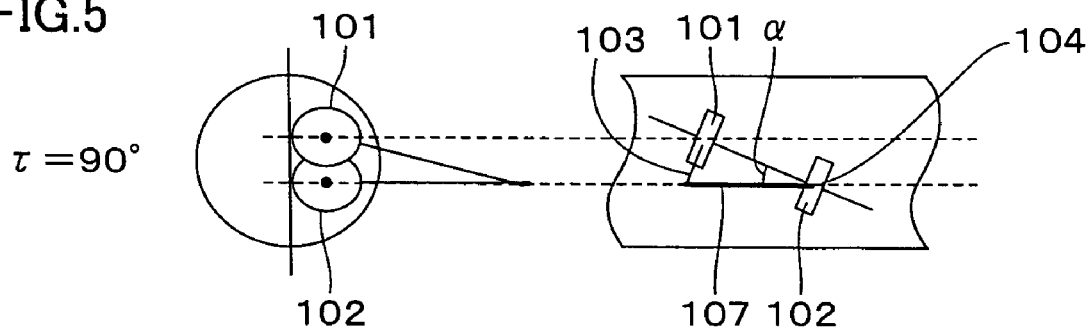
Figure 6:
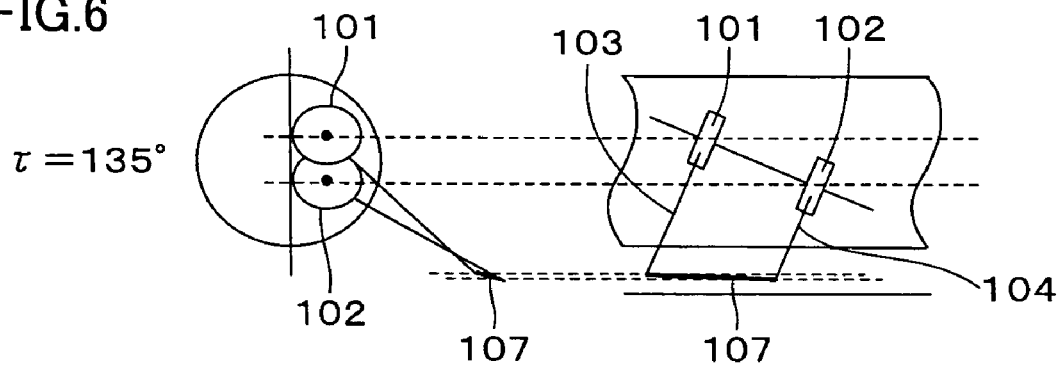
Figure 7:
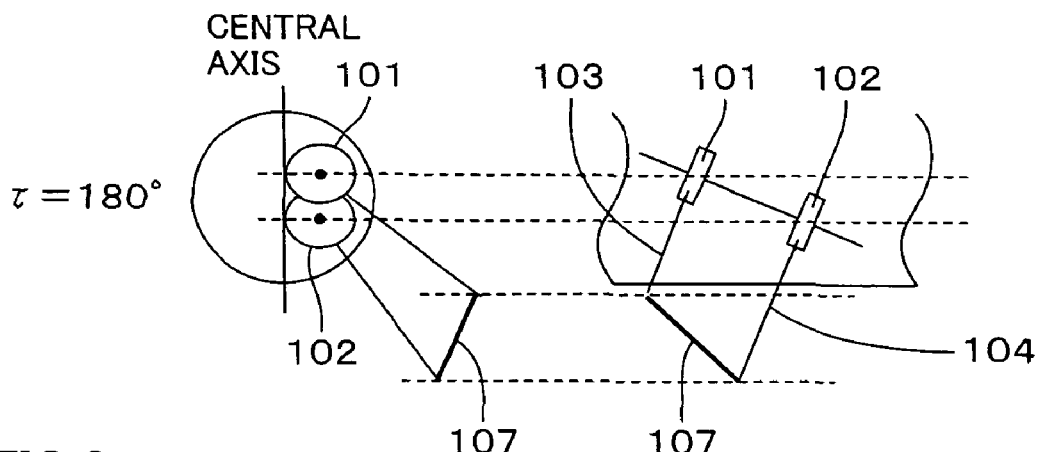
Figure 8:
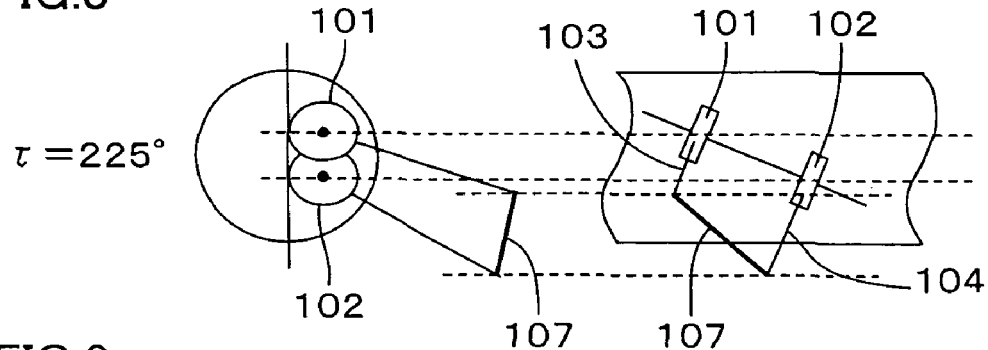
Figure 9:
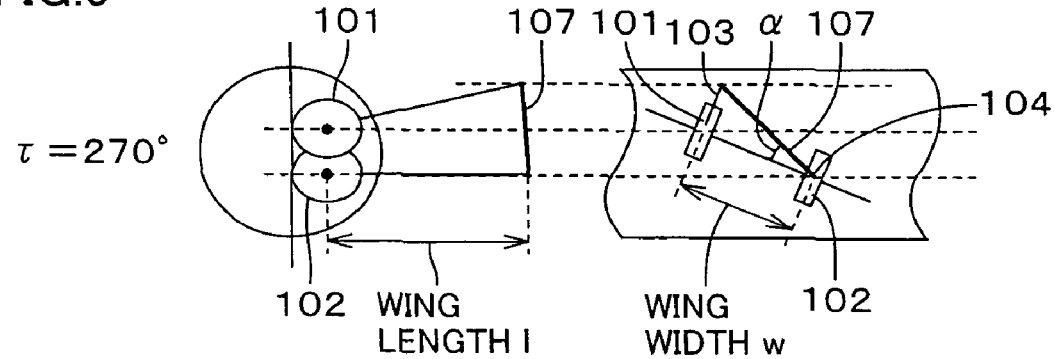
Figure 10:
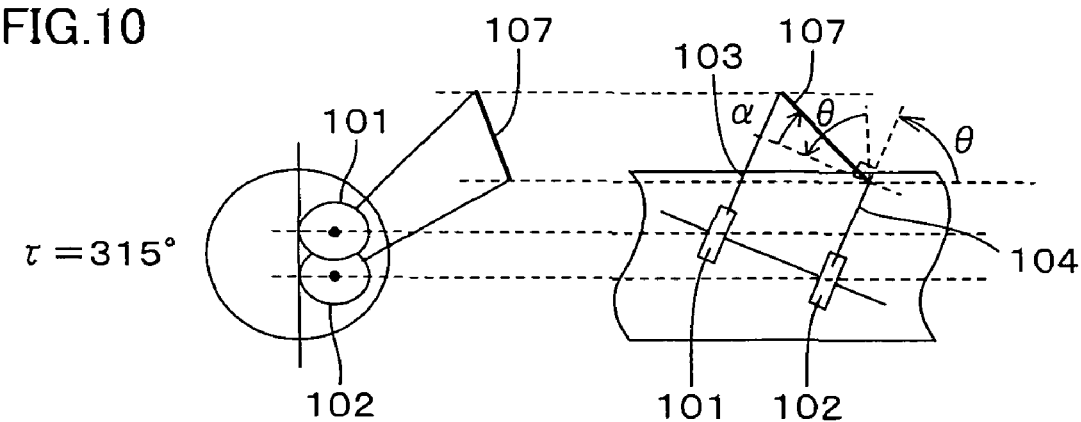

A flapping apparatus as the moving apparatus in accordance with an embodiment of the present invention will be described with reference to the figures. FIG. 1 shows the flapping apparatus having two wing shafts as the wing portion, in which (a) is a front view of the flapping apparatus and (b) is a left side view, viewed from the front face of the flapping apparatus.

Though only the left wing viewed from the front face of the flapping apparatus is shown in (a) and (b) of FIG. 1, actually, a right wing is also formed in mirror-symmetry with respect to the central axis 802 of a main body 105. For simplicity of description, it is assumed that a main body axis 801 along the direction of extension of main body 105 is in a horizontal plane, and that the central axis 802 passing through the center of gravity extends along the vertical direction.

As can be seen from (a) and (b) of FIG. 1, on main body 105 of the flapping apparatus, a wing (left wing) is formed, which has a front wing shaft 103 and a rear wing shaft 104 and a wing film (main wing) 106 provided bridging across the front and rear wing shafts 103 and 104.

A rotary actuator 101 for driving front wing shaft 103 and a rotary actuator 102 for driving rear wing shaft 104 are mounted on main body 105. Such an arrangement of actuators 101 and 102 as well as the shape of the wing including front wing shaft 103, rear wing shaft 104 and wing film 106 are not limited to those described herein, provided that the flight function is assured.

Further, in the flapping apparatus, when the cross sectional shape of the wing is adapted to protrude vertically upward, a drag as well as lift are generated for the flight in the horizontal direction, resulting in larger buoyancy.

The position of center of gravity of the flapping apparatus is set to be lower than the point of application of the force received by the wing from ambient fluid to the actuator, to enhance stability of the flapping apparatus. When quick change of the attitude of the flapping apparatus is of higher priority, it is desirable that the center of gravity and the point of application are substantially the same. In that case, difference of the force exerted by the fluid on the left and right wings necessary for attitude control becomes smaller, and hence change in attitude of the flapping apparatus becomes easier.

Two rotary actuators 101 and 102 have a common axis of rotation 800. The axis of rotation 800 forms a prescribed angle (90°−θ) with the axis 801 of the main body. Front and rear wing shafts 103 and 104 perform a reciprocating operation in a plane that orthogonally crosses the axis of rotation 800, with the actuator 101, 102 being a fulcrum, respectively. The angle formed by the plane orthogonally crossing the axis of rotation 800 and the axis 801 of the main body is the elevation θ. The elevation θ is changed by an elevation control portion 108. Elevation control portion 108 rotates support portions supporting rotary actuators 101 and 102 about a central axis of rotation extending in the left-right direction. Consequently, front wing shaft 103 and rear wing shaft 104 rotate together with rotary actuators 101 and 102 about the central axis of rotation extending in the left-right direction. As a result, elevation θ changes by the angle of rotation in proportion to the angle of rotation of elevation control portion 108. Accordingly, when elevation control portion 108 controls the angle of rotation, the angle formed by the plane including the trajectory of reciprocating operation of front wing shaft 103 or a plane including the trajectory of reciprocating operation of rear wing shaft 104 and a phantom reference plane including the front-rear direction and the left-right direction can be changed.

In order to ensure both mechanical strength and lightweight, main body 105 of the flapping apparatus should desirably be formed by polyethylene terephthalate (PET) molded to a cylindrical shape. The material and the shape of main body 105, however, are not limiting.

An ultrasonic progressive wave actuator using a piezoelectric element is desirable as the actuators 101 and 102, as it has large activation torque, enables reciprocating operation in a simple manner and has a simple structure. Such an actuator is classified into two types, that is, rotary actuator and linear actuator. In the example shown in (a) and (b) of FIG. 1, rotary actuators are used.

A method of directly driving the wing by an ultrasonic element using progressive wave will be mainly discussed in the following. The mechanism for driving the wing and the type of the actuator used therefor, however, are not limited to those described with respect to the present embodiment.

Figure 11:
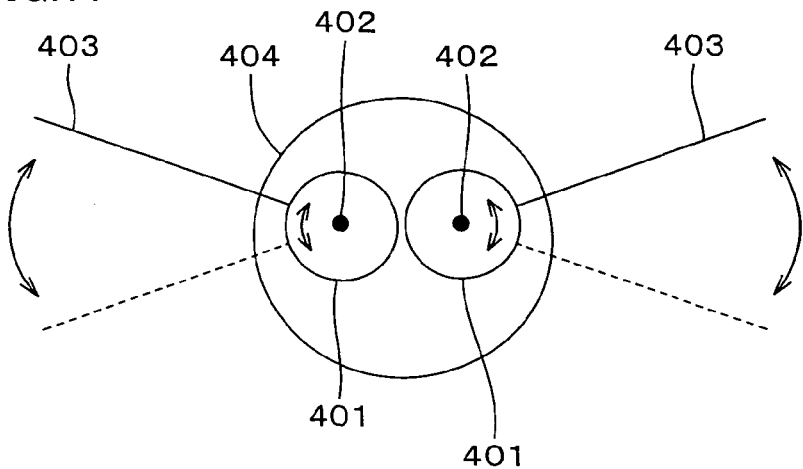
FIG. 11 is a schematic front view showing a modification of the flapping apparatus in accordance with the embodiment.

As the rotary actuator, a rotary actuator 401 shown in FIG. 11, for example, may be used, other than the rotary actuators 101 and 102 shown in (a) and (b) of FIG. 1.

In the flapping apparatus shown in FIG. 11, a front wing shaft or a rear wing shaft 403 is attached to a rotary actuator 401 mounted on main body 404. The front or rear wing shaft 403 performs a rotating operation about the rotation axis 402 of rotary actuator 401. It is possible to have rotary actuators 101 and 102 to perform the rotating operation as described above, using a voice coil motor in place of rotary actuator 401.

As a mechanism for driving the wing portion, a mechanism having an exoskeleton structure and a linear actuator combined may be applied. A flapping apparatus employing such a mechanism is shown in FIGS. 12 and 13.

Figure 12:
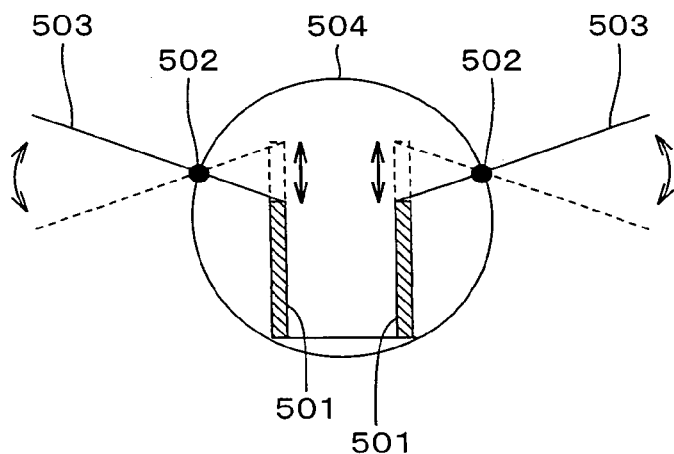
FIG. 12 is a schematic front view showing another modification of the flapping apparatus in accordance with the embodiment.

In the flapping apparatus shown in FIG. 12, a front wing shaft or a rear wing shaft 503 is connected to one end of a linear actuator 501. Motion of linear actuator 501 is transmitted to the front or rear wing shaft 503 through a hinge 502 attached to main body 504, so that flapping motion occurs. The flapping motion is conceived from the flapping motion of a dragonfly, the wing of which is directly driven by the muscle.

Figure 13:
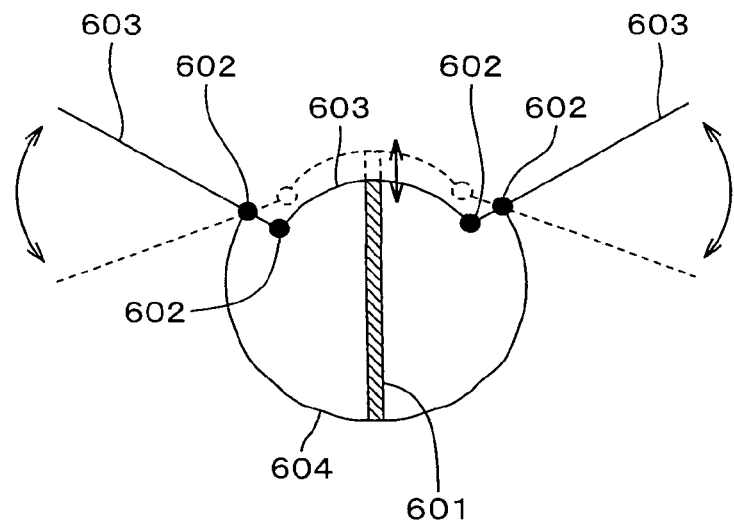
FIG. 13 is a schematic front view showing a further modification of the flapping apparatus in accordance with the embodiment.

In the flapping apparatus shown in FIG. 13, the main body is divided into an upper main body 603 and a lower main body 604. Motion of a linear actuator 601 fixed on lower main body 604 is transmitted to upper main body 603. The motion of upper main body 603 is transmitted to the front or rear wing shaft 603 through a hinge 602 as a fulcrum, and the flapping motion occurs. This flapping operation is conceived from the flapping operation of a bee, not the dragonfly.

In the flapping apparatus shown in FIG. 13, the front and rear wing shafts 603 on the left and right sides are simultaneously driven by one actuator 601, and therefore, separate driving of left and right wing shafts is impossible. Therefore, delicate flight control of the flapping apparatus is impossible. However, as the number of actuators can be reduced, weight and power consumption of the flapping apparatus can be reduced.

In the flapping apparatus shown in (a) and (b) of FIG. 1, front wing shaft 103 and rear wing shaft 104 are respectively connected to rotary actuators 101 and 102. A wing film 106 is provided between the front and rear wing shafts 103 and 104. The wing film 106 has initial stress in a direction of contraction in its plane, which serves to enhance stiffness of the entire wing.

In order to reduce weight, front and rear wing shafts 103 and 104 are formed to have a hollow structure, from carbon graphite. Thus, the front and rear wing shafts 103 and 104 have elasticity, and front and rear wing shafts 103 and 104 are deformable by the tension of wing film 106.

Figure 14:
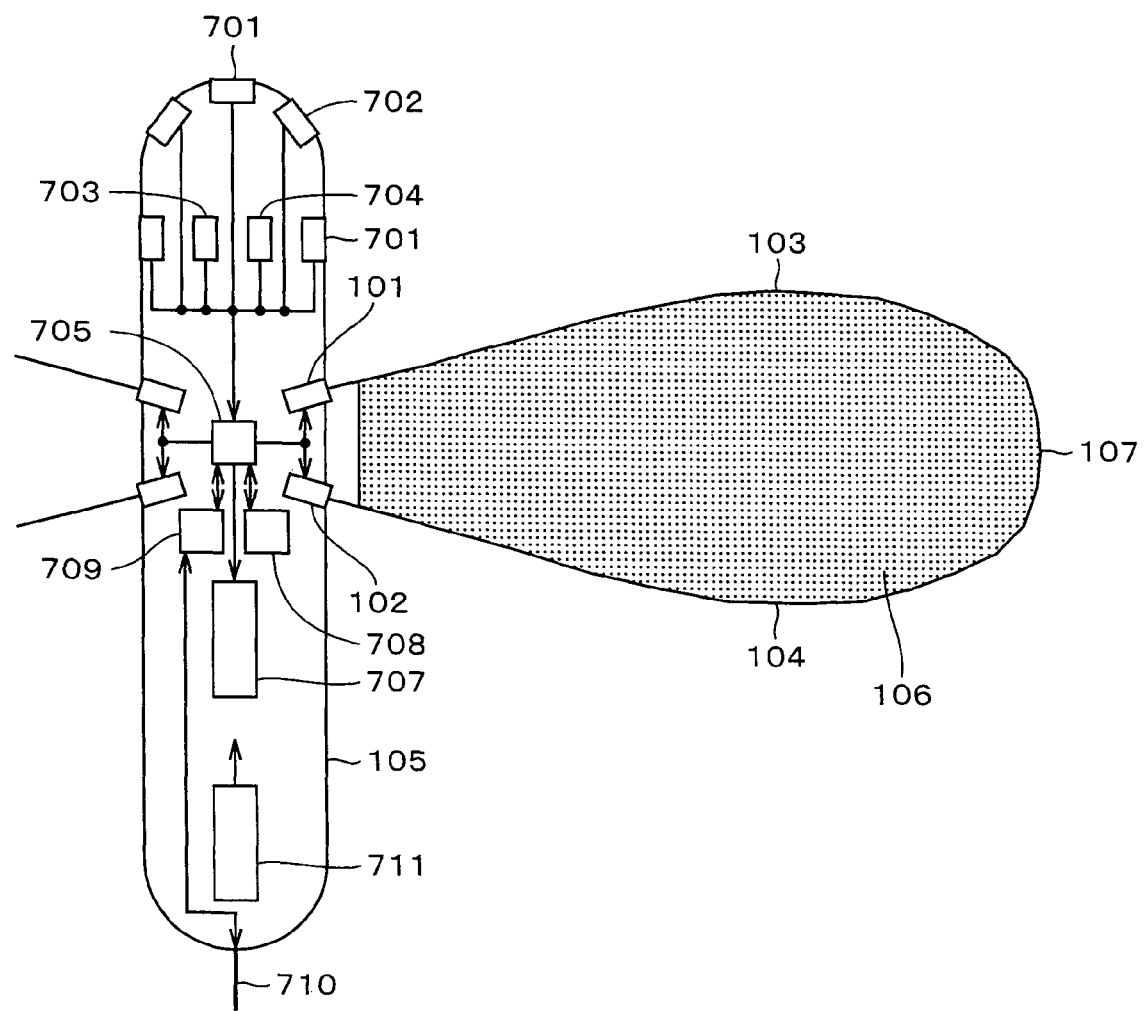
FIG. 14 is a schematic plan view showing an overall structure of the flapping apparatus shown in FIG. 1.

FIG. 14 shows an overall structure of the flapping apparatus of the present invention. The wing on the left side along the direction of progress (upward on the sheet) is not shown.

On main body 105, an ultrasonic sensor 701, an infrared sensor 702, an acceleration sensor 703 and an angular acceleration sensor 704 are arranged. Results of detection by these sensors are transmitted to a flapping control portion 705. Flapping control portion 705 processes information such as distance between the flapping apparatus and an obstacle or a person near the apparatus, from the results detected by the ultrasonic sensor 701 or infrared sensor 702. Further, information such as the state of flight, target position or attitude of the flapping apparatus is processed from the results detected by acceleration sensor 703 or angular acceleration sensor 704, and driving control of left and right actuators 101 and 102 and a center of gravity control portion 707 is determined. Reciprocating motions of front wing shaft 103 and rear wing shaft 104 are controlled accordingly. As a result, wing film 106 performs a prescribed flapping motion.

Though ultrasonic sensor 701 and infrared sensor 702 are used as means for detecting an obstacle existing around the flapping apparatus and acceleration sensor 703 and angular acceleration sensor 704 are used as means for detecting position and attitude of the flapping apparatus, the sensors are not limited to these, and any sensor that can measure environmental conditions, position and attitude of the flapping apparatus may be used.

For example, the attitude of the flapping apparatus can be calculated from acceleration information obtained by arranging two acceleration sensors capable of measuring acceleration in three axial directions orthogonally crossing with each other, arranged at different positions of main body 105. Further, it is possible to calculate position and attitude of the flapping apparatus by providing a magnetic field distribution in the space in which the flapping apparatus moves, and by detecting the magnetic field distribution by a magnetic sensor.

In FIG. 14, sensors represented by acceleration sensor 703 and angular acceleration sensor 704 are shown as components separate from flapping control portion 705. In order to reduce weight, the sensors may be formed integrally with and on the same substrate as flapping control portion 705 by micromachining technique, for example.

Though wing portion of the flapping apparatus is open-loop controlled, closed-loop control is also possible by providing an angle sensor at a root of the wing portion and using angle information obtained from the angle sensor.

When flow of the fluid in the space where the apparatus flies is known and flight is possible in accordance with a predetermined method of flapping, the sensors listed above are not essential.

Flapping control portion 705 is connected to a memory portion 708, and existing data necessary for flapping control may be read from memory portion 708. Further, information obtained by sensors 701 to 704 may be fed to memory portion 708 and information in memory portion 708 is rewritten as needed. The flapping apparatus may have a learning function.

When the information obtained by sensors 701 to 704 is to be simply stored in memory portion 708, sensors 701 to 704 may be directly connected to memory portion 708, not through flapping control portion 705. Alternatively, flapping control portion 705 may be connected to communication control portion 709, allowing data input to/output from communication control portion 709. Communication control portion 709 transmits/receives data to/from an external apparatus through an antenna portion 710.

Such a communication function enables speedy transfer of data obtained by the flapping apparatus and stored in memory portion 708 to an external apparatus. Further, it is possible to receive from an external apparatus information that cannot be obtained by the flapping apparatus and to store such information in memory portion 708, so that such information can be used for flapping control. Without storing a large amount of map information fully in the flapping apparatus, it is possible to obtain map information of a desired area as needed from a base station.

Though antenna portion 710 is shown as a bar protruding from an end of main body 105 in the example shown in FIG. 14, it may have any shape or arrangement provided that an antenna function is attained. For example, a loop shaped antenna may be formed on the wing film 106, utilizing front wing shaft 103 or rear wing shaft 104. Alternatively, the antenna may be contained in main body 105, or the antenna and communication control portion 709 may be integrated, in the flapping apparatus.

Ultrasonic sensor 701, infrared sensor 702, acceleration sensor 703, angular acceleration sensor 704, flapping control portion 705, left and right actuators 101 and 102, center of gravity control portion 707, memory portion 708, communication control portion 709 and antenna portion 710 are driven by a current supplied from a power supply portion 711.

Though electric power is used as driving energy, an internal combustion engine may be used. An actuator utilizing physiological oxidation-reduction reaction as can be seen in the muscle of insects may be used. Further, a method of obtaining energy for driving the actuator from the outside may be possible. For example, a thermister (therminoic element), an electromagnetic wave or the like may be used for the electric power.

(Method of Flight)

For simplicity of description, it is assumed that external force acting on the present flapping apparatus is only the fluid force received by the wing from the fluid and the gravity acting on the flapping apparatus (a product of the mass of the flapping apparatus and gravitational acceleration). For the flapping apparatus to fly constantly, it is necessary that the following relation is satisfied in time average of one flapping operation:

(vertically upward fluid force acting on the wing)>(gravity acting on the flapping apparatus).

One flapping operation means a down stroke of the wing followed by an up stroke of the wing.

For the apparatus to rise with the vertically upward fluid force being dominant, the following relation must be satisfied:

(vertically upward fluid force acting on the wing in a down stroke)>(vertically downward fluid force acting on the wing in an up stroke).

Here, a method by which the vertically upward fluid force acting on the wing in a down stroke (hereinafter referred to as "fluid force for down stroke") is made larger than the vertically downward fluid force acting on the wing in an up stroke (hereinafter referred to as "fluid force for an up stroke") will be described, which is a method of flapping corresponding to but simplified from the manner of flapping of an insect.

For simplicity of description, the behavior of the fluid or the force of the fluid on the wing will be described with reference to main components thereof. The magnitude of the buoyancy obtained by the flapping method and the gravity acting on the flapping apparatus (hereinafter referred to as "weight") will be described later.

In order to make the fluid force for a down stroke larger than the fluid force for an up stroke, the down stroke should be such that the volume of a space in which the wing film 106 moves in the down stroke is maximized. For this purpose, the wing film 106 should be moved downward approximately parallel to the horizontal plane, whereby almost maximum fluid force can be obtained.

By contrast, for the up stroke, the wing should be moved upward such that the volume of the space in which wing film 106 moves is minimized. For this purpose, the wing film 106 should be moved upward approximately at a right angle with respect to the horizontal plane, and the fluid force exerted on the wing is approximately minimized.

In the present embodiment, the wing shafts 103 and 104 are rotated by an angle γ (flapping angle) about the rotation axis 800 by rotary actuators 101 and 102, respectively. Further, the reciprocating motion of rear wing shaft 104 is adapted to be delayed by a phase φ from the reciprocating motion of the front wing shaft 103.

Accordingly, in the series of reciprocating motions of the wing shown in FIGS. 3 to 10 (representing an example where θ=20°), front wing shaft 103 of rotary actuator 101 which is at a higher position is moved downward earlier in the down stroke shown in FIGS. 3 to 7, and therefore tip end portion 107 of the wing between the tip ends of front and rear wing shafts 103 and 104 comes closer to horizontal.

In the up stroke shown in FIGS. 7 to 10, difference in height of the tip ends of wing shafts 103 and 104 increases and tip end portion 107 of the wing comes closer to vertical. As a result, the amount of fluid moved downward or upward by the wing film 106 becomes different. In this flapping apparatus, the fluid force for the down stroke becomes larger than the fluid force for the up stroke, and hence buoyancy is generated.

The vector of the buoyancy inclines forward or backward by changing the phase difference φ. When it is inclined forward, the apparatus moves forward, when it is inclined backward, the apparatus moves backward and when it is directed directly upward, the apparatus hovers. In the actual flight, it is possible to control flapping frequency f, or flapping angle γ that can define the maximum angle (stroke angle) of front wing shaft 103 or rear wing shaft 104, in addition to phase difference φ.

(Flapping Control)

The actual flapping control will be described in greater detail. Here, a prescribed phantom plane including two wing shafts when the phase τf of flapping motion of front wing shaft 103 and the phase τb of flapping motion of rear wing shaft 104 are the same is used as a reference, and an angle formed by the tip end portion 107 of the wing and the prescribed phantom plane is the torsion angle α. In the above described flapping apparatus, the torsion angle α provided by the tip end of the wing in the down stroke or up stroke can be approximately represented by the following equation, where l represents wing length (length of the wing film along the front and rear wing shafts 103 and 104), w represents wing width (distance between front and rear wing shafts 103 and 104), γ represents flapping angle, τ represents phase of the flapping motion (the instant of highest up stroke being 0° and the lowest down stroke being 180°), and φ represents phase difference between the front and rear wing shafts 103 and 104 (see FIGS. 3, 5, 9 and 10):

$$\tan \alpha = (w/l) \cdot [\sin(\gamma \cdot \cos \tau) - \sin\{\gamma \cdot \cos(\tau + \phi)\}]$$

Actually, the front and rear wing shafts are elastic and deformable, and therefore, the torsion angle α may vary to some extent. Further, the angle is smaller closer to the root of the wing shaft. For simplicity of description, the angle α in accordance with the above equation will be used for the following discussion. Other than the plane described above, a plane formed by the flapping motion of the tip end portion 107 of the wing (generally referred to as a stroke plane) or a horizontal plane (a plane vertical to the direction of gravity) may be used as the prescribed phantom plane for defining the torsion angle α. What is important in the moving apparatus of the present invention is to change elevation of the wing portion during the flapping motion. In the present embodiment, torsion angle α is used as a physically equivalent parameter to the elevation.

Vertical component F of the fluid force acting on the wing free of torsion is approximately given by the following equation, where ρ represents density of the fluid, γ represents flapping angle and f represents flapping frequency.

$$F = (4/3) \cdot \pi^2 \rho w \gamma^2 f^2 l^3 \cdot \sin^2 \tau \cdot \cos(\gamma \cdot \cos \tau)$$

By integrating this equation on τ, average F⊥ of one period is given by $$F\perp = (1/6) \cdot \pi^3 \rho w \gamma^2 f^2 l^3 (3 + \cos \gamma).$$

It is noted that horizontal components acting on the left and right wing portions cancel each other when the left and right wing portions make the same motion.

When the wing has a torsion angle of α↓ at the down stroke and a torsion angle of α↑ at the up stroke, components L and D that are vertical and horizontal to the plane of flapping motion, respectively, of the component F⊥ can be given by:

$$L\uparrow = F\perp \cdot \sin \alpha\uparrow \cdot \cos \alpha\uparrow$$

$$D\uparrow = F\perp \cdot \sin^2 \alpha\uparrow$$

for the up stroke, and $$L\downarrow = F\perp \cdot \sin \alpha\downarrow \cdot \cos \alpha\downarrow$$

$$D\downarrow = F\perp \cdot \sin^2 \alpha\downarrow$$

for the down stroke.

Therefore, average lift L and drag D for one period of flapping are given by $$L=(L\uparrow+L\downarrow)/2=(F\perp/2)\sin(\alpha\uparrow+\alpha\downarrow)\cos(\alpha\uparrow-\alpha\downarrow)$$

$$D=(D\uparrow+D\downarrow)/2=(F\perp/2)\sin(\alpha\uparrow+\alpha\downarrow)\sin(\alpha\uparrow-\alpha\downarrow)$$

Considering the equations above and the elevation θ of flapping, vertical component A that must be balanced with gravity and horizontal component J that will be the thrust of forward/backward motion are as follows:

$$A = L \cdot \cos\theta + D \cdot \sin\theta \quad (1)$$
$$= (F\perp/2)\sin(\alpha\downarrow+\alpha\uparrow)\cos(\alpha\downarrow-\alpha\uparrow+\theta)$$

$$J = L \cdot \sin\theta - D \cdot \cos\theta \quad (2)$$
$$= (F\perp/2)\sin(\alpha\downarrow+\alpha\uparrow)\sin(\alpha\downarrow-\alpha\uparrow+\theta)$$

Figure 15:
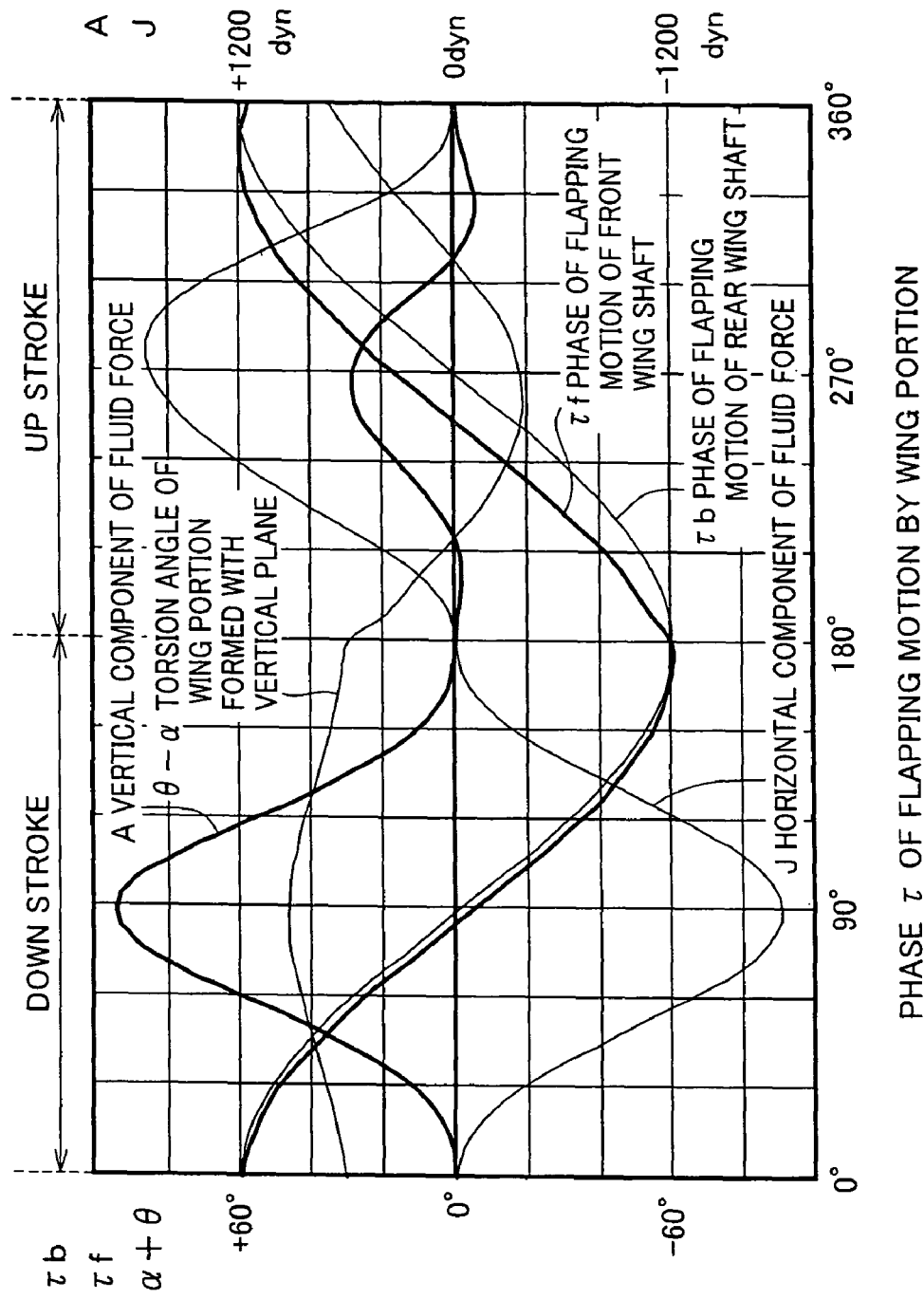
FIG. 15 is a first graph representing changes in force acting on the wing and the angle with respect to the phase of the flapping motion, respectively.

Based on the foregoing, time change of the vertical component A and the horizontal component J together with the time change of angles are plotted in FIG. 15 as an example of flight control, where the length of the wing of the flapping apparatus 1=4 cm, wing width w=1 cm, flapping elevation θ=30°, flapping angle γ=60°, flapping frequency f=50 Hz, phase difference for the down stroke φ↓=4° and phase difference for the up stroke φ↑=16°.

In FIG. 15, the abscissa represents the time corresponding to one period of flapping motion, as phase τ. The former half of FIG. 15 represents a down stroke and the latter half an up stroke. Curves of the graphs represent changes with time of phase τf of the flapping motion of the front wing shaft 103, phase τb of the flapping motion of the rear wing shaft 104, torsion angle of the wing from a vertical plane (θ−α), and vertical component (buoyancy) A and horizontal component (thrust) J of the fluid force.

In this example, vertical component A (buoyancy) of the fluid force per unit time is larger in the down stroke than in the up stroke, and therefore, one wing provides vertically upward fluid force of about 500 dyn as an average for one period. Namely, if the weight of the flapping apparatus is about 1 g or smaller, it can be lifted by two wings. The horizontal component J (thrust) of the fluid force per unit time is almost cancelled in one period, and hence, a flapping apparatus having the weight of about 1 g can hover.

Here, when the phase difference for the down stroke φ↓ is made larger or when the phase difference for the up stroke φ↑ is made smaller, the flapping apparatus can move forward. At this time, for horizontal forward movement of the flapping apparatus, it is desired that the frequency f be reduced slightly. On the contrary, when the phase difference for the down stroke φ↓ is made smaller or the phase difference for the up stroke φ↑ is made larger, the apparatus can move backward. For horizontal backward movement, it is desired that the frequency f be increased slightly.

When the phase difference for the up stroke φ↑ is kept at 16° while the phase difference for the down stroke φ↓ is enlarged to 7°, or when the phase difference for the down stroke φ↓ is kept at 4° while the phase difference for the up stroke φ↑ is made smaller to 11° with the flapping frequency f decreased to f=48 Hz, the flapping apparatus can move horizontally forward at the speed of 1 m in the initial 1 second.

When the phase difference for the up stroke φ↑ is kept at 16° and the phase difference for the down stroke φ↓ is made smaller to 1°, or when the phase difference for the down stroke φ↓ is kept at 4° while the phase difference for the up stroke φ↑ is enlarged to 24° with the flapping frequency f increased to f=54 aHz, the apparatus can move horizontally backward at the speed of about 1 m for the initial 1 second.

In order to raise or lower the flapping apparatus in the hovering state, the frequency f may be increased or decreased. During horizontal flight, upward movement and downward movement can be controlled mainly by the frequency f By increasing the frequency f, the flapping apparatus moves upward, and by lowering frequency f the flapping apparatus moves downward.

In the present example, the torsion angle α of the wing is slowly changed during an up stroke or a down stroke, in order to reduce load on the actuator. As the flapping motion to obtain high buoyancy, the torsion angle α may be set at a predetermined value during an up stroke or down stroke and the torsion angle α may be abruptly changed at the transition point from a down stroke to an up stroke or from an up stroke to the down stroke.

Figure 16:
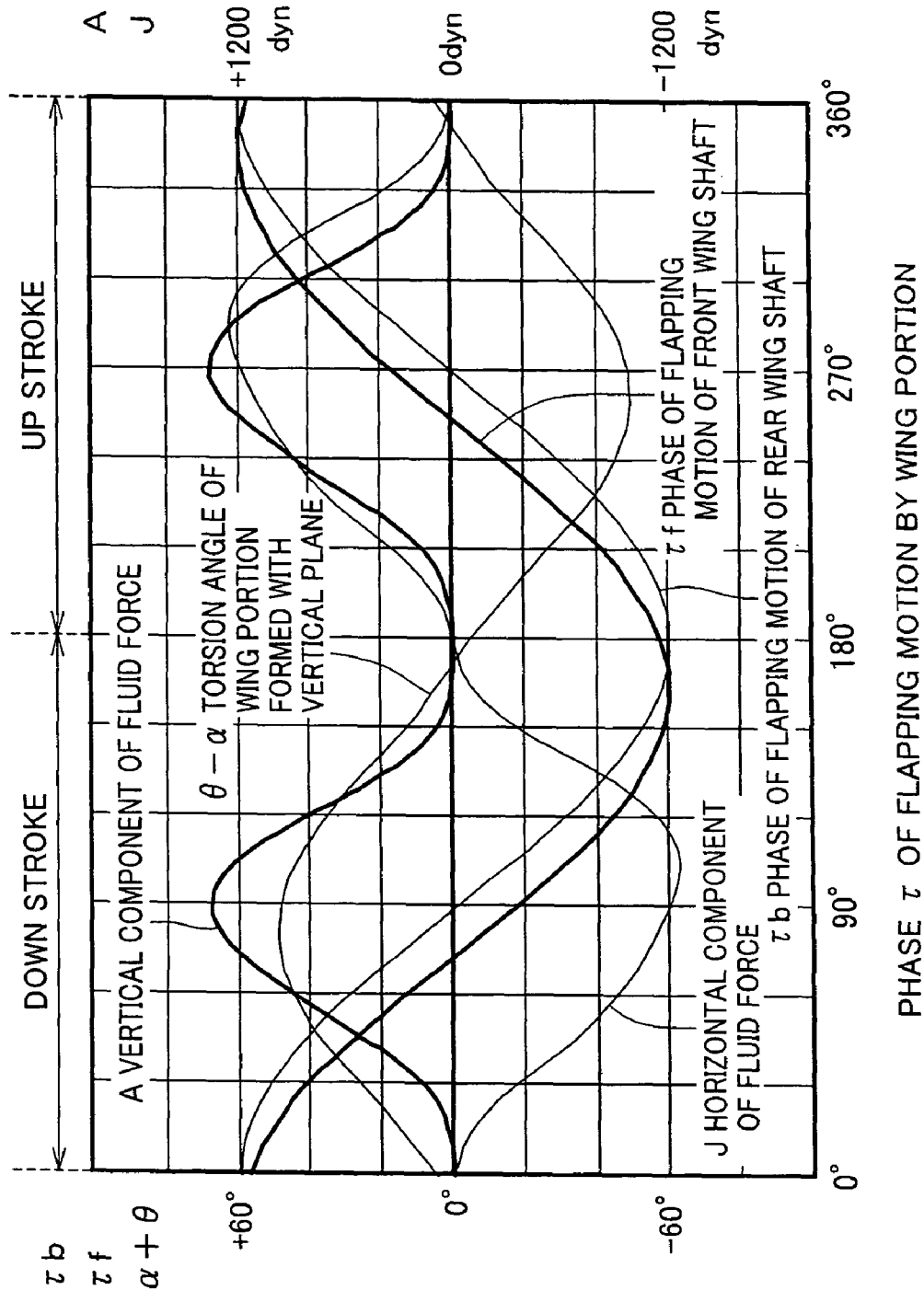
FIG. 16 is a second graph representing changes in the force acting on the wing and the angle with respect to the phase of the flapping motion, respectively.

FIG. 16 shows change with time of the vertical component (buoyancy) A and horizontal component (thrust) J together with the change with time of the angles, where flapping elevation θ=0°. This example shows a flapping motion conceived from the hovering of a humming bird. Steering to the left or to the right may be realized by generating a difference in thrust of left and right wings, if it is possible to separately control flapping motions of the left and right wings. For example, when the apparatus is flying forward and is to be turned to the right, the flapping angle γ of the right wing should be made smaller than that of the left wing, or phase difference between the front wing shaft and the rear wing shaft of the right wing is made larger than that of the left wing, or alternatively, the flapping elevation θ of the right wing should be made smaller than the left wing, if the flapping elevation θ is controllable. Thus, the thrust of the right wing becomes lower relative to the thrust of the left wing, and hence the apparatus can turn to the right. When the flapping apparatus is to be turned to the left, the control is opposite.

When separate control of the left and right wings is not possible as in the flapping apparatus shown in FIG. 13, a center of gravity control portion 707 that is mounted in the flapping apparatus shown in FIG. 14 may be mounted in the present flapping apparatus so as to shift the center of gravity of the flapping apparatus to the left or to the right, to enable turning to the left or to the right.

For example, by shifting the center of gravity to the right, inclining the right wing downward and the left wing upward, and by increasing the frequency f, the flapping apparatus can turn to the right. By shifting the center of gravity to the left inclining the right wing upward and the left wing downward, and by increasing the frequency f in the similar manner, the flapping apparatus can turn to the left. This method is also applicable when separate control of the two wings is possible. In any type of the flapping apparatuses, it is desired that flapping frequency f for the left be set to the same value as the flapping frequency f for the right, so as to keep stable the attitude of the apparatus.

In the example described above, the planes in which the front and rear wing shafts 103, 104 reciprocate orthogonally cross the rotation axis 800. In this case, these two planes are parallel to each other. As shown in FIG. 14, however, the plane that includes the trajectory of reciprocating motion of the front wing shaft 103 and the plane that includes the trajectory of reciprocating motion of the rear wing shaft 104 may cross at an angle. In that case, because of the elasticity of the front (rear) wing shaft 103, 104 and the tension of wing film 106, the transition from a positive value to a negative value or from a negative value to the positive value of the torsion angle α of the wing, at a transition from an up stroke to the down stroke or from a down stroke to an up stroke can be attained more quickly.

Figure 17:
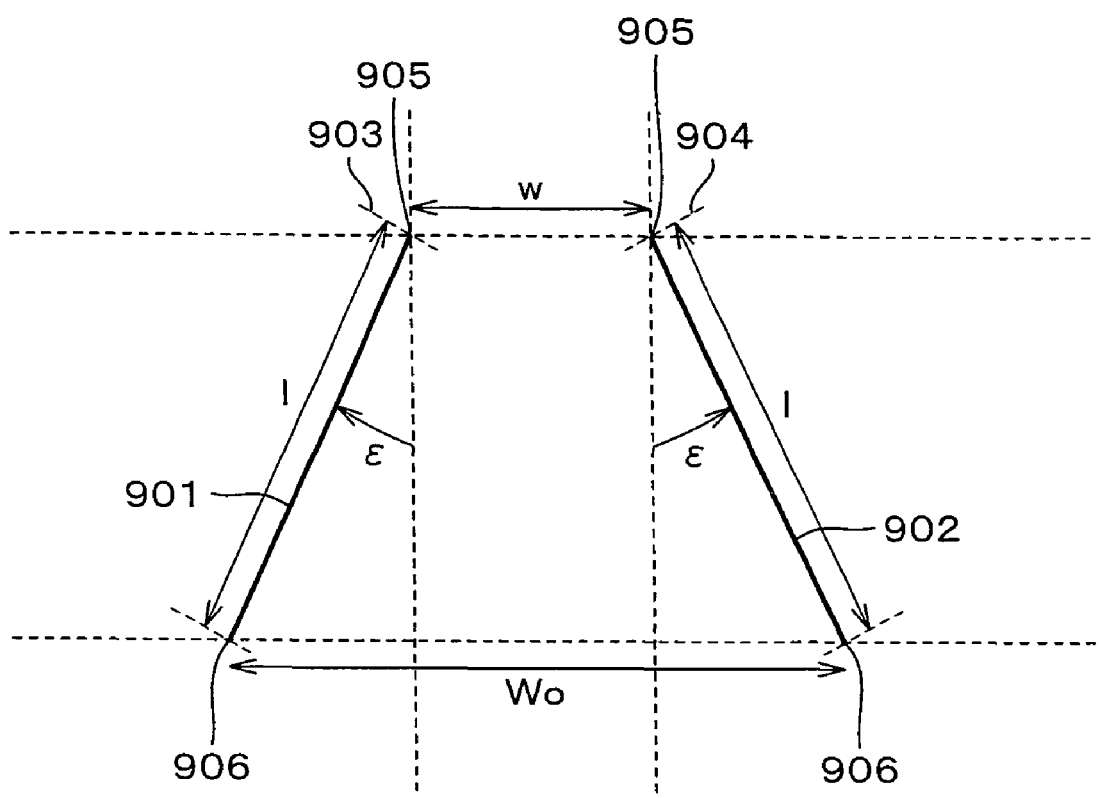
FIG. 17 shows a relation between two wing shafts when a front wing shaft and a rear wing shaft are positioned outward by an angle E from mutually parallel positions.

Referring to FIG. 17, when tip end directions of front (rear) wing shafts 901 and 902 are outward by an angle ϵ from mutually parallel positions, the distance W₀ between the tip ends 906 of the wing shafts becomes the maximum with the wing torsion angle α=0° (γf=γb), when the value ϵ satisfies the following relation, where w represents the width between the roots 905 of the wing shafts and l represents the length of the wing shaft. Therefore, the elasticity of the wing shaft and the tension of the wing film also become the maximum, and the state where the absolute value |α|>0 becomes stabler. Thus, the change in the torsion angle α can be attained more quickly.

$$\sin \epsilon > \{(w^2+8\cdot l^2)^{1/2}-w\}/(4\cdot l)$$

The value ϵ satisfying the above relation is, when the aspect ratio of the wing Ap(l/w)=1, ϵ>30°, when Ap=4, ϵ>17.2°, and when Ap=10, ϵ>11.5°.

When degree of freedom for the front and rear wing shafts 901 and 902 to pivot about their axes is added, it becomes possible to rotate the portion of the wing film 106 that is fixed to the front wing shaft 901 and the portion of the wing film 106 that is fixed to the rear wing shaft 902 to be substantially opposite to each other, regardless of the change in positional relation between the front and rear wing shafts 901 and 902. Therefore, the load on the actuator driving the front and rear wing shafts 901 and 902 can be reduced and highly efficient control becomes possible.

First Embodiment

The method of controlling the flapping apparatus above will be described in the following.

The flapping angle of front wing shaft 103 is γ+Δγ/2, and the flapping angle of rear wing shaft 104 is γ−Δγ/2. Specifically, amplitude difference between front wing shaft 103 and rear wing shaft 104 is Δγ. Here, the flapping angle refers to the maximum value or minimum value of the angle of rotation in the reciprocating motion of front wing shaft 103 or rear wing shaft 104.

The reciprocating motion of front wing shaft 103 is a motion (simple harmonic oscillation) represented by sin (τ+ϕ/2), and the reciprocating motion of rear wing shaft 104 is a motion (simple harmonic oscillation) represented by sin (τ−ϕ/2). In other words, phase difference between the front and rear wing shafts 103 and 104 is ϕ.

Therefore, torsion angle α of the wing can be approximately represented by the following equation (3), where the phase difference ϕ is not very large.

$$\alpha=(\gamma+\Delta\gamma/2)\sin(\tau+\phi/2)-(\gamma-\Delta\gamma/2)\sin(\tau-\phi/2)\approx\Delta\gamma\sin\tau+\gamma\phi\cos\tau \quad (3)$$

Here, sin τ and cos τ are linearly independent. In equation (3), the value of Δγ as a coefficient of sin τ and the value of ϕ as a coefficient of cos τ can be changed independently. Therefore, the control portion can change the torsion angle α variously by independently changing the amplitude difference Δγ and phase difference ϕ, during the flapping motion.

Figure 18:
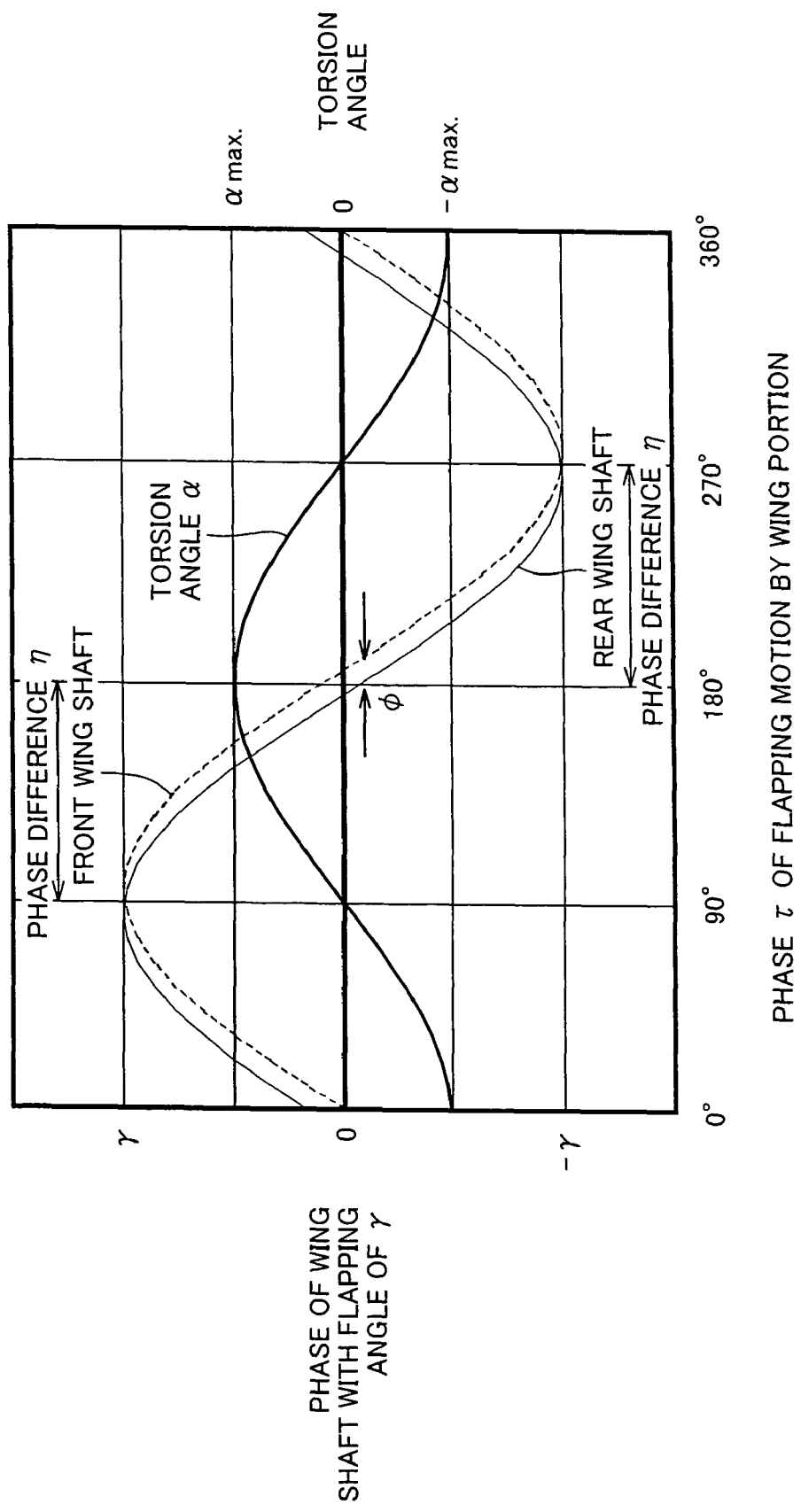
FIG. 18 is a first graph representing a relation between the change in phase of reciprocal motion and the change in phase of torsion angle of front and rear wing shafts with the flapping angel of $\gamma$.

Particularly, in the state where amplitude difference Δγ=0°, when the phase difference ϕ only is controlled, the torsion angle α makes a change that can be represented by a function ± cos τ shifted in phase by ±90° from the function sin τ representing the flapping motion. Whether cos τ has a positive or negative sign is determined dependent on whether the former (latter) term of equation (3) represents the motion of the front (rear) wing shaft or the rear (front) wing shaft. FIG. 18 shows the relation between the motion of front wing shaft 103, motion of rear wing shaft 104, and the change in torsion angle α, at the flapping angle γ. From FIG. 18, it can be seen that the maximum value γ or minimum value −γ of the angle of rotation in the reciprocating motion of front or rear wing shaft 103 or 104 and the maximum value or minimum value of torsion angle α is shifted approximately by 90°.

Figure 19:
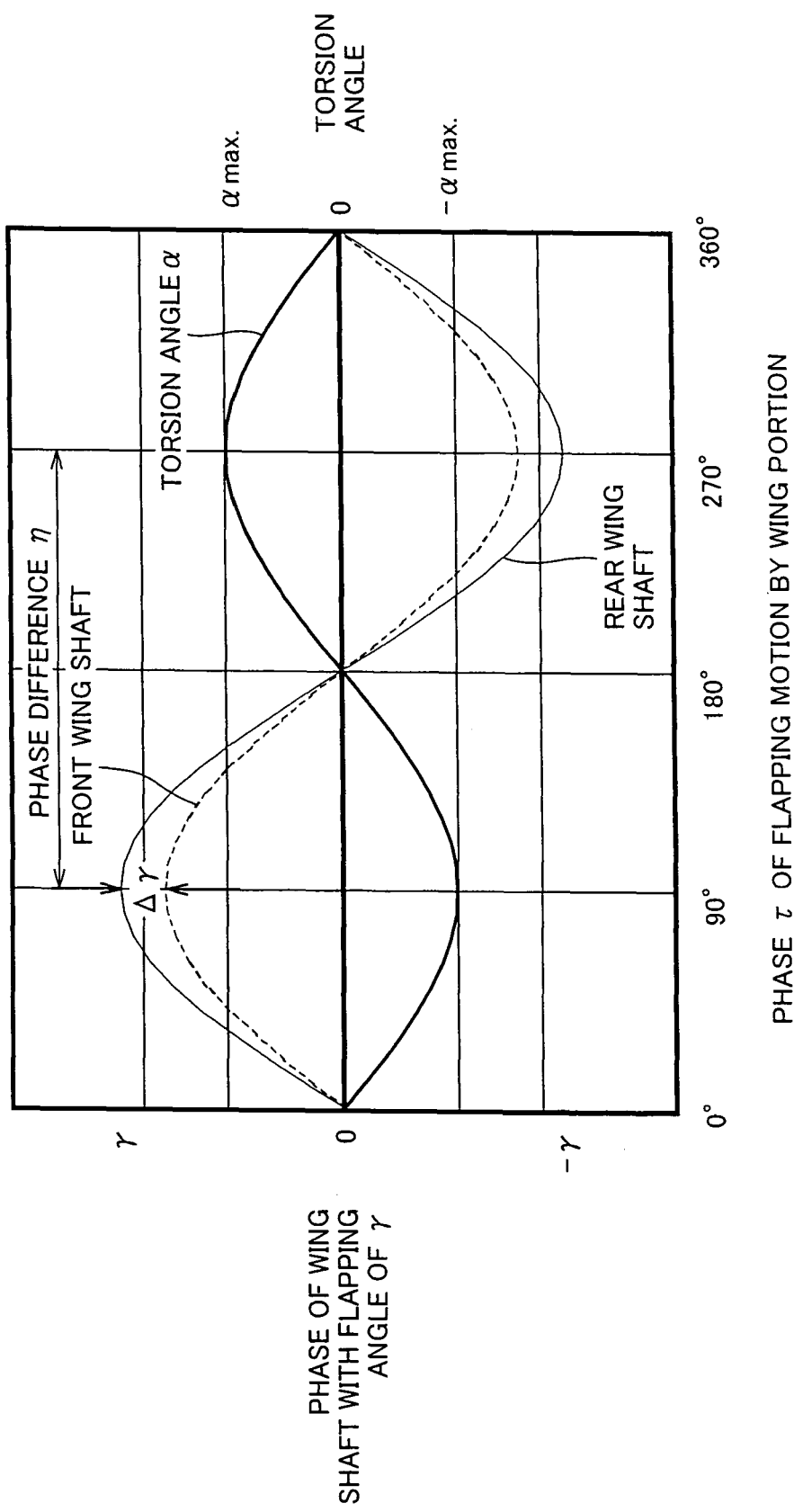
FIG. 19 is a second graph representing a relation between the change in phase of reciprocal motion and the change in phase of torsion angle of front and rear wing shafts with the flapping angel of γ.

In the state where the phase difference ϕ=0°, when amplitude difference Δγ only is controlled, the torsion angle α changes in a manner represented by a function ± sin τ, which is of the same phase (0°) or opposite phase (180°) as the function sin τ representing the flapping motion. Whether sin τ has a positive or negative sign is determined also dependent on whether the former (latter) term of equation (3) represents the motion of the front (rear) wing shaft or the rear (front) wing shaft. FIG. 19 shows the relation between the motion of front wing shaft 103, motion of rear wing shaft 104, and change in torsion angle α, at the flapping angle γ. From FIG. 19, it can be seen that the maximum value γ or minimum value −γ of the angle of rotation in the reciprocating motion of front or rear wing shaft 103 or 104 and the maximum value or minimum value of the phase of torsion angle α is shifted approximately by 180°.

The flattering apparatus performing the flapping motion shown in these figures can hover, by way of example, by controlling only the phase difference ϕ where flapping elevation θ=0° and amplitude difference Δγ=0°. Further, by way of example, the flapping apparatus can fly forward or backward by controlling the amplitude difference Δγ only, where flapping elevation θ=90° and phase difference ϕ=0°. Details will be discussed in the second embodiment below.

The flapping apparatus can fly by the flapping motion even when both the phase difference ϕ and amplitude difference Δγ are changed.

Second Embodiment

In an actual flight, at the transition from the hovering state to forward flight or backward flight, it is desired to increase the thrust J in the forward/backward direction without much changing the buoyancy A.

Assume that the apparatus is hovering in the state where flapping elevation θ=0° and amplitude difference Δγ=0°, by controlling the phase difference ϕ, as described above. When the elevation θ is enlarged or the torsion angle α↓ for the down stroke is made different from the torsion angle α↑ for the up stroke simply from this state, it follows that, as can be seen from equations (1) and (2), when thrust J is made larger, buoyancy A becomes smaller, and when buoyancy A is made larger, thrust J becomes smaller. Therefore, an approach is proposed for supplementing the decrease in buoyancy A as thrust J is made larger, by increasing the flapping frequency f or flapping angle γ.

It is noted, however, that the torque required of actuators 101 and 102 is in proportion to the square of flapping angle γ or frequency f Therefore, when the decrease in buoyancy A is to be supplemented by increasing frequency f or flapping angle γ, power consumption increases. Therefore, an approach with higher energy efficiency is used, in which direct transition from hovering to linear flight is made without changing the frequency f or flapping angle γ up to a certain ground speed. In this approach, first, the flapping elevation θ is set slightly large in the hovering state. Consequently, buoyancy A decreases slightly while thrust J increases rapidly, as can be seen from equations (1) and (2). By way of example, when the flapping elevation θ is increased from 0° to 20°, buoyancy A decreases by about 6% from equation (1), assuming that α↑=α↓. On the other hand, from equation (2), thrust J increases by as much as 34%. The decrease in buoyancy A to this extent can be supplemented by simply increasing the flapping frequency f from =40 Hz to 41.3 Hz. Increase in power consumption at this time is about 7%.

As the thrust increases, the flapping apparatus starts, for example, moving forward. When the flapping apparatus moves forward at a ground speed V, it receives wind of speed V coming from ahead. Here, buoyancy A and thrust J can be given by the following equations, respectively. Here, it is assumed that front wing shaft 103 or rear wing shaft 104 having the flapping angle γ and the torsion angle α change in a manner represented by a sinusoidal wave, and during flapping motion, front wing shaft 103 and rear wing shaft 104 make motions at the same frequency f with phases shifted from each other by η.

$$A=(16/45)\cdot\pi^2\rho w\gamma^2 f^2 l^3 \cdot \cos\theta\cdot\sin 2\alpha\cdot\sin\eta\cdot(4+\cos\gamma)+(2/3)\cdot\pi\rho w\gamma f l^2 V \sin 2\theta[\cos^2\alpha(2+\cos\gamma)+\sin^2\alpha\cdot\cos 2\eta\cdot(6-\cos\gamma)/5]$$

$$J=(16/45)\cdot\pi^2\rho w\gamma^2 f^2 l^3 \cdot \sin\theta\cdot\sin 2\alpha\cdot\sin\eta\cdot(4+\cos\gamma)+(2/3)\cdot\pi\rho w\gamma f l^2 V \cos 2\theta[\cos^2\alpha(2+\cos\gamma)+\sin^2\alpha\cdot\cos 2\eta\cdot(6-\cos\gamma)/5]$$

Figure 20:
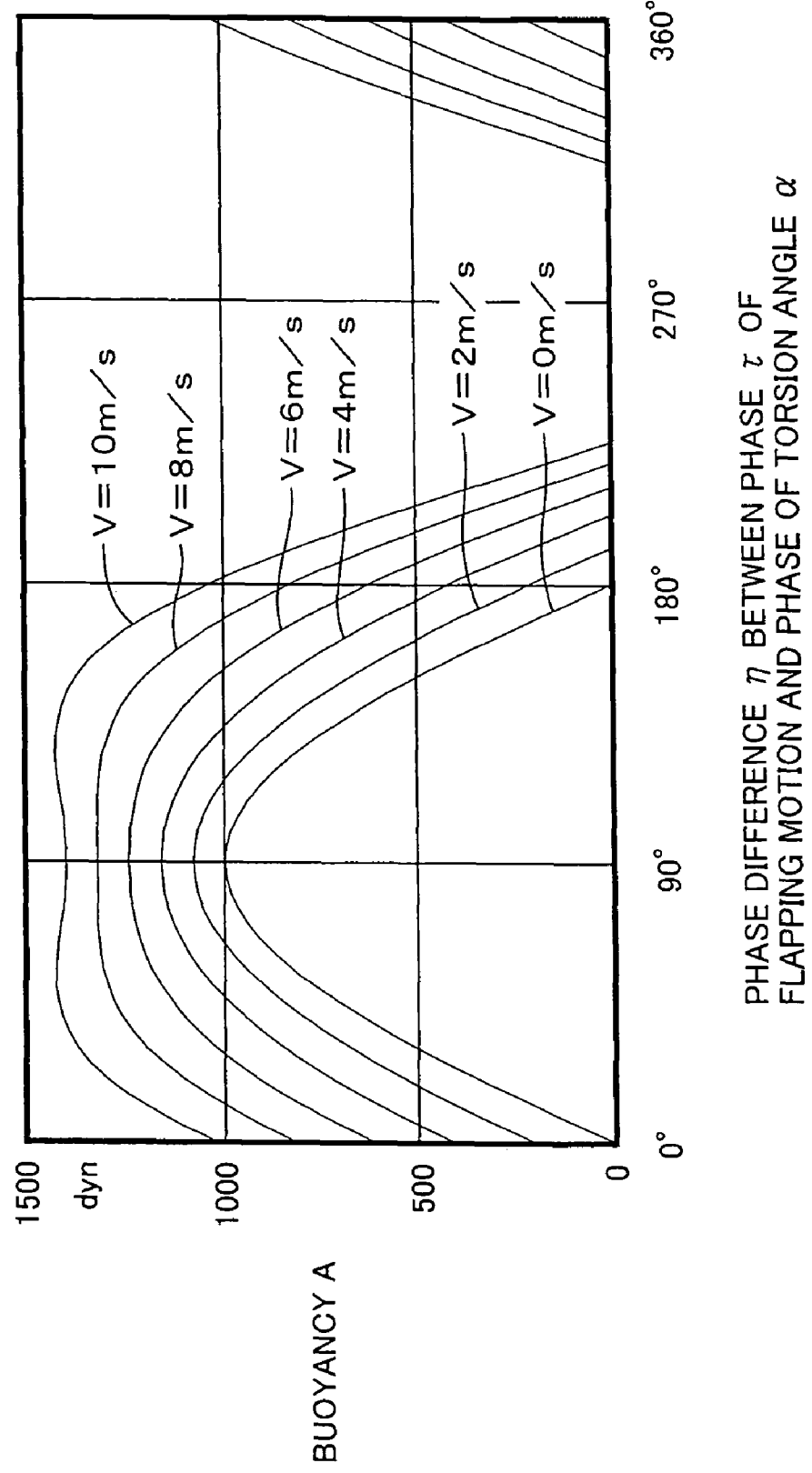
FIG. 20 is a graph representing a relation between buoyancy and difference between the phase of flapping motion and phase of torsion angle, at various ground speeds.
Figure 21:
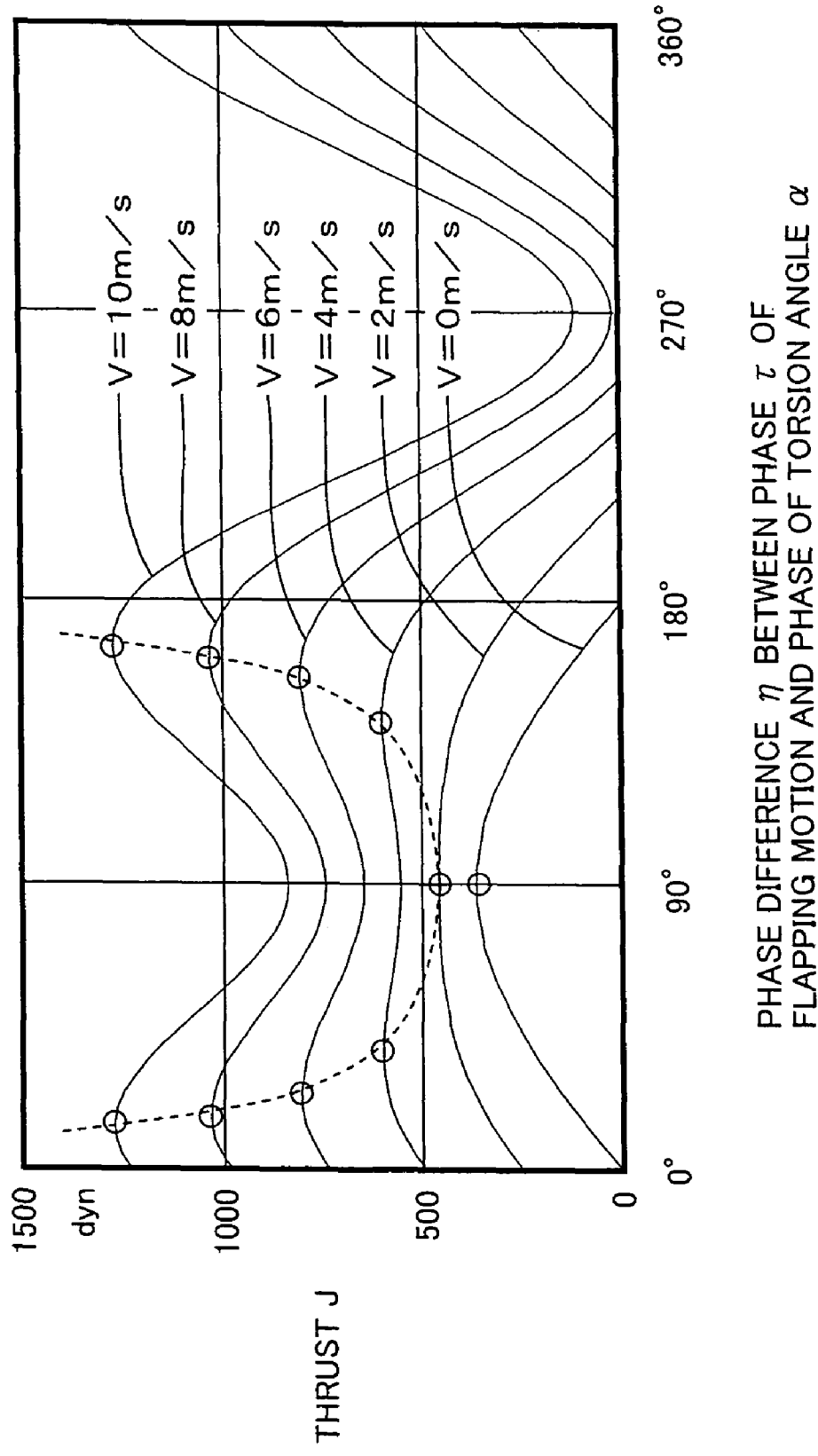
FIG. 21 is a graph representing a relation between thrust and difference between the phase of flapping motion and phase of torsion angle, at various ground speeds.
Figure 22:
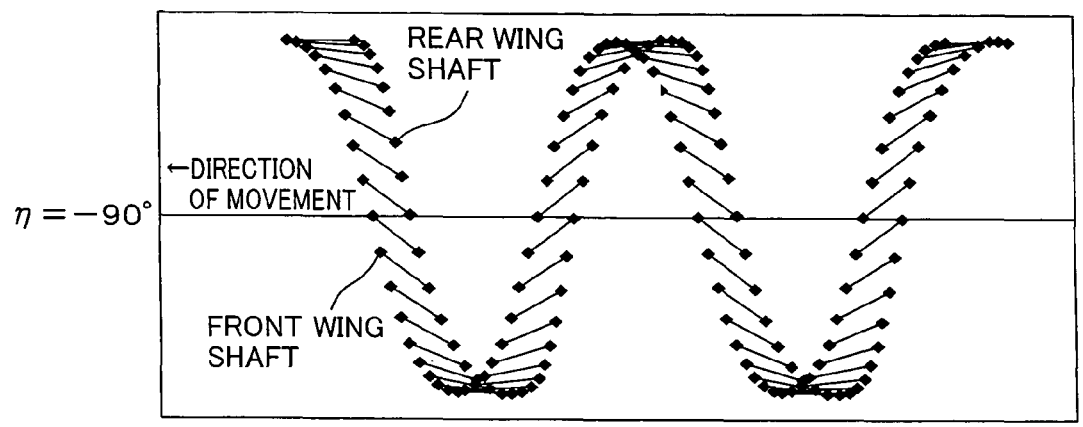
FIG. 22 shows phase difference and amplitude difference of front and rear wing shafts when phase difference η is −90°.
Figure 23:
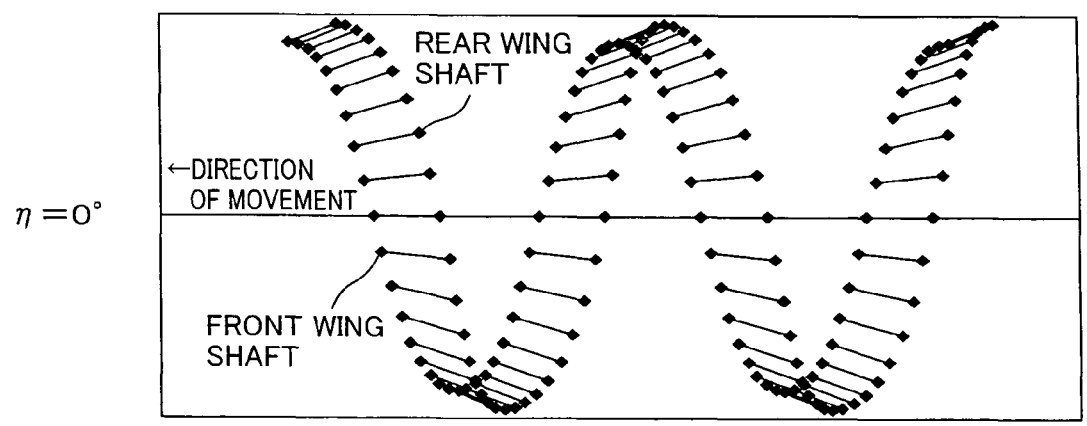
FIG. 23 shows phase difference and amplitude difference of front and rear wing shafts when phase difference η is 0°.
Figure 24:
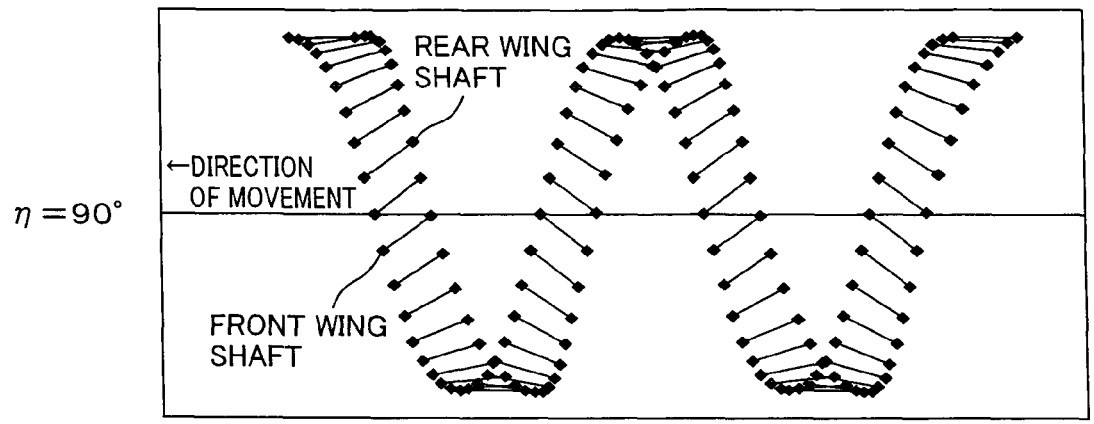
FIG. 24 shows phase difference and amplitude difference of front and rear wing shafts when phase difference η is 90°.
Figure 25:
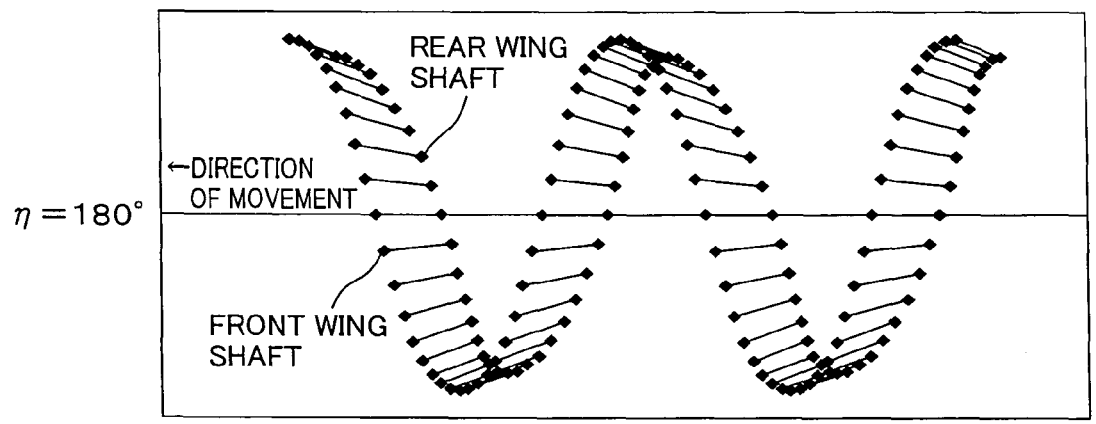
FIG. 25 shows phase difference and amplitude difference of front and rear wing shafts when phase difference η is 180°, in accordance with a second embodiment.

FIGS. 20 and 21 show manner of change in buoyancy A and thrust J, when ground speed increased from 0 m/s to 10 m/s, with the following values input to the above described equation: fluid density ρ=1.18 mg/cm³ (air at room temperature and atmospheric pressure); wing length l=4 cm; wing width w=1 cm; flapping frequency f=38 Hz; flapping angle γ=60°; maximum torsion angle α=45°; and flapping elevation θ=20°. The abscissa represents phase difference η between the phase of reciprocating motion of front wing shaft 103 or rear wing shaft 104 reciprocating at a flapping angle of γ and the phase of periodic change in torsion angle α.

It can be understood from FIG. 20 that as ground speed V of flapping apparatus increases, buoyancy A generated on the flapping apparatus increases. In this example, the highest buoyancy of about 1000 dyn (under the gravity of the earth, a force that can lift an object of about 1 g) can be attained when the ground speed is V=0 m/s and phase difference η=90°. It can be understood, however, that the phase difference η need not be fixed at 90° to lift an object of 1 g, as the buoyancy increases along with the increase of ground speed. When the ground speed is 2 m/s, the phase difference η can be changed within the range of 90°±26°, when it is 4 m/s, within the range of 90°±44°, when it is 6 m/s, within the range of 90°±62°, when it is 8 m/s, within the range of 90°±79°, and when it is 10 m/s, within the range of 90°+92°, as can be seen from FIG. 20.

From FIG. 21, it can be seen that thrust J increases as the ground speed V increases. It is noted, however, that the value η (denoted by ○ in FIG. 21) corresponding to the peak thrust J appears at two points on both sides of the position where η=90°, and that the two values η corresponding to the peak come closer to 0° and 180°, respectively (see the dotted line of FIG. 21). The value η that attains the peak thrust J is 90° when the ground speed is 2 m/s or lower. When it is 4 m/s, η is within the range of 90°±35°, when it is 6 m/s, within the range of 90°±55°, when it is 8 m/s, within the range of 90°±70°, and when it is 10 m/s, within the range of 90°±75°. These values are within the possible range of variation of phase difference η shown in FIG. 20. Therefore, it can be understood that the most efficient method of increasing ground speed without losing buoyancy is to change the phase difference η to be closer to the value attaining peak thrust J as the ground speed increases.

FIGS. 22 to 25 show exemplary operations of front wing shaft 103 and rear wing shaft 104 having the phase difference φ and amplitude difference Δγ, with phase difference η being −90°, 0°, 90° and 180°, respectively.

The next problem is how to change the phase difference η. There are many methods of changing the phase difference η. In order to prevent much variation in buoyancy A, it is desired to change the phase difference η between the periodic change of front wing shaft 103 or rear wing shaft 104 reciprocating with the flapping angle γ and the periodic change of torsion angle α, while keeping constant α max. of the torsion angle α.

When the position of front wing shaft 103 or rear wing shaft 104 with the flapping angle γ changes as represented by γ·sin τ, the change in torsion angle α delayed in phase by phase difference η from front wing shaft 103 or rear wing shaft 104 can be represented by the equation α=α max·sin (τ+η).

By developing this equation, we can derive the following equation.

$$\alpha = \alpha\text{max}\cdot\sin(\tau+\eta)$$
$$= \alpha\text{max}\cdot\cos\eta\cdot\sin\tau + \alpha\text{max}\cdot\sin\eta\cdot\cos\tau.$$

When we compare this equation with α≈Δγ sin τ+γφ cos τ of equation (3), it is understood that the change as represented by the following equations is preferable.

$$\Delta\gamma = \alpha\text{ max}\cdot\cos\eta \qquad (4)$$

$$\gamma\cdot\phi = \alpha\text{ max}\cdot\sin\eta$$

$$\therefore \phi=(\alpha\text{ max}./\gamma)\cdot\sin\eta \qquad (5)$$

Therefore, by changing the amplitude difference Δγ and phase difference φ in the manner as represented by equations (4) and (5), the phase difference η can be set to any value while keeping constant the maximum value α max. of torsion angle α.

When the phase difference η is to be changed, values of amplitude difference Δγ and phase difference φ corresponding to the desired phase difference η are input to equations (4) and (5). Consequently, it becomes possible to continuously change the phase difference η between the periodic changes of reciprocating motion of front wing shaft 103 with flapping angle γ and the torsion angle α. As a result, smooth (efficient) transition from hovering to forward flight or backward flight becomes possible.

Third Embodiment

In the present embodiment, buoyancy A and thrust J are defined as follows.

$$A=(16/45)\cdot\pi^2\rho w\gamma^2 f^2 l^3 \cdot\cos\theta\cdot\sin 2\alpha\cdot\sin\eta\cdot(4+\cos\gamma)+\pi\rho w l V^2\cdot\cos^2\alpha\cdot\sin 2\theta$$

$$J=(16/45)\cdot\pi^2\rho w\gamma^2 f^2 l^3 \cdot\sin\theta\cdot\sin 2\alpha\cdot\sin\eta\cdot(4+\cos\gamma)-\pi\rho w l V^2(\cos^2\alpha\cdot\cos 2\theta+1)$$

Figure 26:
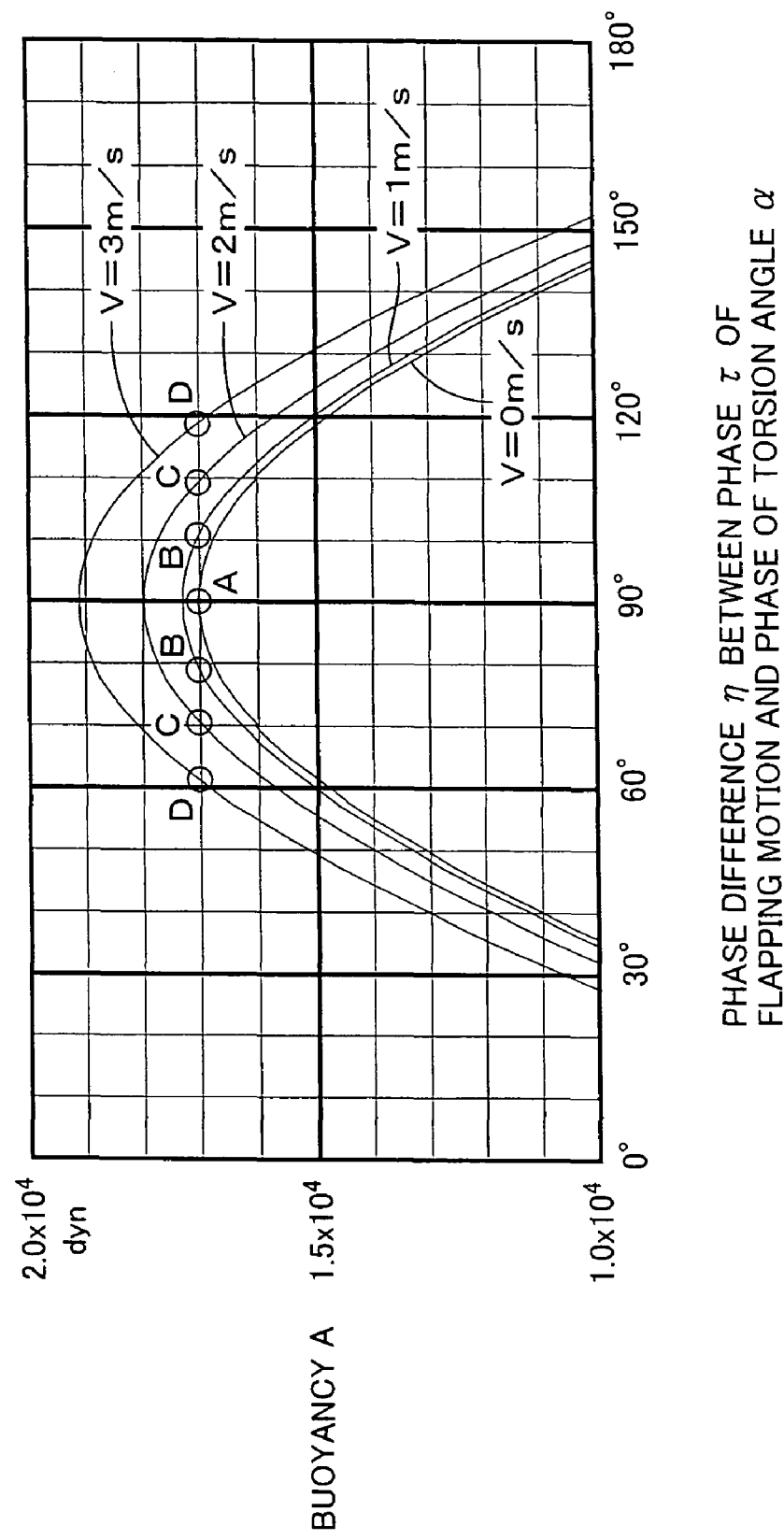
FIG. 26 is another graph representing a relation between buoyancy and difference between the phase of flapping motion and phase of torsion angle, at various ground speeds.

In accordance with these definitions, results such as shown in FIGS. 26 and 27 can be attained.

FIGS. 26 and 27 show manner of change in buoyancy A and thrust J, when ground speed increased from 0 m/s to 3 m/s, with the following values input to the above described equation: fluid density ρ=1.18 mg/cm³ (air at room temperature and atmospheric pressure); wing length l=8 cm; wing width w=2 cm; flapping frequency f=30 Hz; flapping angle γ=60°; maximum torsion angle α=45°; and flapping elevation θ=25°. The abscissa represents phase difference η between the phase of reciprocating motion of front wing shaft 103 or rear wing shaft 104 reciprocating at a flapping angle of γ and the phase of periodic change in torsion angle α.

It can be understood from FIG. 26 that as ground speed V of flapping apparatus increases, buoyancy A generated on the flapping apparatus increases. In this example, the highest buoyancy of about $1.7 \times 10^4$ dyn (under the gravity of the earth, a force that can lift an object of as heavy as about 17 g) can be attained when the ground speed is V=0 m/s and phase difference η=90°. It can be understood, however, that the phase difference η need not be fixed at 90° to lift an object of 17 g, as the buoyancy increases along with the increase of ground speed. Further, it can also be understood from FIG. 26 that phase difference t mentioned above may be 90° (∘A of FIG. 26) at the time of hovering, that is, when the ground speed is 0 m/s, while it is desired to be changed within the range of 90°±10° when the ground speed is 1 m/s (∘B of FIG. 26), 90°±20° when the ground speed is 2 m/s (∘C of FIG. 26), and 90°±30° when the ground speed is 3 m/s (∘D of FIG. 26).

It can be understood from FIG. 27 that thrust J decreases because of wind pressure as the ground speed increases. It is noted, however, that even when the phase difference η is changed in the manner as described above (∘ A~D: corresponding to FIG. 26), thrust J is kept positive until the ground speed reaches 3 m/s. When the thrust J attains 0, increase of the ground speed V stops, that is, acceleration of the flapping apparatus attains 0, and therefore, the speed of flight (velocity at which the flapping apparatus moves forward) is maintained. Therefore, it is understood that the most efficient method of increasing the ground speed without lowering buoyancy is to change the value of phase difference η without changing the frequency f or flapping angle γ, until the ground speed V attains to a prescribed value (about 3 m/s in the example above).

The moving apparatus in accordance with the present embodiment can also provide similar effects as attained by the moving apparatus of the second embodiment.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A moving apparatus, comprising:
   a wing portion making a flapping operation in a space where a fluid exists;
   a driving portion causing the flapping operation of said wing portion;
   a control portion controlling said driving portion; and
   a main body portion to which said driving portion and said control portion are mounted; wherein:
   said wing portion includes:
   one wing shaft portion and another wing shaft portion connected to said driving portion, and
   a wing body portion formed at least across said one wing shaft portion and said another wing shaft portion;
   said driving portion includes:
   one driving portion causing said one wing shaft portion to make a first periodic motion, and
   another driving portion for separately and independently from said one driving portion causing said another wing shaft portion to make a second periodic motion; and
   said control portion controls said one driving portion and said another driving portion such that an amplitude difference between said first periodic motion and said second periodic motion is changed, thereby changing a torsion angle formed by a tip end of said wing body portion and a prescribed phantom plane.

2. The moving apparatus according to claim 1, wherein said control portion controls said one driving portion and said another driving portion such that said amplitude difference changes while a first phase difference between said first periodic motion and said second periodic motion is kept constant.

3. A moving apparatus, comprising:
   a wing portion making a flapping operation in a space where a fluid exists;
   a driving portion causing the flapping operation of said wing portion;
   a control portion controlling said driving portion; and
   a main body portion to which said driving portion and said control portion are mounted; wherein:
   said wing portion includes:
   one wing shaft portion and another wing shaft portion connected to said driving portion, and
   a wing body portion formed at least across said one wing shaft portion and said another wing shaft portion;
   said driving portion includes:
   one driving portion for causing said one wing shaft portion to make a first periodic motion, and
   another driving portion for separately and independently from said one driving portion causing said another wing shaft portion to make a second periodic motion; and
   said control portion controls said one driving portion and said another driving portion such that at least one of
   (i) a first phase difference between said first periodic motion and said second periodic motion and
   (ii) an amplitude difference between said first periodic motion and said second periodic motion
   is changed, so as to change a torsion angle formed by a tip end of said wing body portion and a prescribed phantom plane, wherein said torsion angle makes a periodic change; and
   said control portion controls said one driving portion and said another driving portion such that a second phase difference between
   (iii) at least one of said first and second periodic motions and
   (iv) said periodic change of said torsion angle is kept constant.

4. A moving apparatus, comprising:
   a wing portion making a flapping operation in a space where a fluid exists;
   a driving portion causing the flapping operation of said wing portion;
   a control portion controlling said driving portion; and
   a main body portion to which said driving portion and said control portion are mounted; wherein:
   said wing portion includes:
   one wing shaft portion and another wing shaft portion connected to said driving portion, and
   a wing body portion formed at least across said one wing shaft portion and said another wing shaft portion;
   said driving portion includes:
   one driving portion for causing said one wing shaft portion to make a first periodic motion, and
   another driving portion for separately and independently from said one driving portion causing said another wing shaft portion to make a second periodic motion; and
   said control portion controls said one driving portion and said another driving portion such that at least one of
   (i) a first phase difference between said first periodic motion and said second periodic motion and (ii) an amplitude difference between said first periodic motion and said second periodic motion is changed,
so as to change a torsion angle formed by a tip end of said wing body portion and a prescribed phantom plane, wherein said torsion angle makes a periodic change; and said control portion controls said one driving portion and
said another driving portion such that a second phase difference between
(iii) at least one of said first and second periodic motions and
(iv) said periodic change in said torsion angle is changed as a speed of flight of said moving apparatus increases, so that a thrust exerted on said moving apparatus increases to a peak value.

5. A moving apparatus, comprising:
a wing portion making a flapping operation in a space where a fluid exists;
a driving portion causing the flapping operation of said wing portion;
a control portion controlling said driving portion; and
a main body portion to which said driving portion and said control portion are mounted; wherein:
said wing portion includes:
one wing shaft portion and another wing shaft portion connected to said driving portion, and
a wing body portion formed at least across said one wing shaft portion and said another wing shaft portion;
said driving portion includes:
one driving portion causing said one wing shaft portion to make a first periodic motion, and
another driving portion separately and independently from said one driving portion said another wing shaft portion to make a second periodic motion; and said control portion controls said one driving portion and said another driving portion such that both a first phase difference between said first periodic motion and said second periodic motion and an amplitude difference between said first periodic motion and said second periodic motion are changed in a manner governed by a common parameter, so as to change a torsion angle formed by a tip end of said wing body portion and a prescribed phantom plane.

6. The moving apparatus according to claim 5, wherein
said torsion angle makes a periodic change; and
said control portion controls said one driving portion and said another driving portion such that a second phase difference between at least one of said first and second periodic motions and said periodic change in said torsion angle is kept constant as both of said phase difference and said amplitude difference are changed in a manner governed by said common parameter.

7. The moving apparatus according to claim 5, wherein
said torsion angle makes a periodic change; and
said control portion controls said one driving portion and said another driving portion such that a maximum amplitude of said periodic change in said torsion angle is kept constant as both of said first phase difference and said amplitude difference are changed in a manner governed by said common parameter.

* * * * *